United States Patent
Yabu et al.

(10) Patent No.: US 10,990,305 B2
(45) Date of Patent: Apr. 27, 2021

(54) STORAGE APPARATUS AND CONFIGURATION MANAGEMENT REQUEST PROCESSING METHOD FOR STORAGE APPARATUS

(71) Applicant: Hitachi, Ltd., Tokyo (JP)

(72) Inventors: Ryosuke Yabu, Tokyo (JP); Shinichiro Kanno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 46 days.

(21) Appl. No.: 16/568,633

(22) Filed: Sep. 12, 2019

(65) Prior Publication Data
US 2020/0192586 A1 Jun. 18, 2020

(30) Foreign Application Priority Data
Dec. 13, 2018 (JP) .............................. JP2018-233920

(51) Int. Cl.
*G06F 3/06* (2006.01)
(52) U.S. Cl.
CPC .......... *G06F 3/0632* (2013.01); *G06F 3/0604* (2013.01); *G06F 3/0683* (2013.01)
(58) Field of Classification Search
CPC ..... G06F 3/0632; G06F 3/0683; G06F 3/0604
See application file for complete search history.

(56) References Cited

U.S. PATENT DOCUMENTS

| | | | | |
|---|---|---|---|---|
| 7,444,459 B2* | 10/2008 | Johnson | ................. | G06F 9/505 711/6 |
| 8,863,145 B2* | 10/2014 | Watanabe | ............... | G06F 9/505 718/105 |
| 8,898,385 B2* | 11/2014 | Jayaraman | .............. | G06F 13/12 711/114 |
| 9,588,686 B2* | 3/2017 | Baptist | .................... | G06F 3/064 |
| 2013/0311685 A1 | 11/2013 | Kudo et al. | | |
| 2015/0006733 A1* | 1/2015 | Khan | .................... | H04L 47/829 709/226 |

FOREIGN PATENT DOCUMENTS

JP 5909566 B2 4/2016

* cited by examiner

*Primary Examiner* — Charles Rones
*Assistant Examiner* — Hewy H Li
(74) *Attorney, Agent, or Firm* — Mattingly & Malur, PC

(57) ABSTRACT

A storage apparatus includes: a plurality of controllers, each of which has a plurality of processors for processing requests; a storage device coupled to the controller; an integration unit that integrally controls the plurality of controllers; and a shared memory that can be accessed from each processor for the plurality of controllers and stores configuration information of the storage apparatus including load information of each processor. The integration unit: calculates estimated processing time of a configuration management request, which has been accepted from a management apparatus, from a request type and a target resource type of the configuration management request; and distributes the configuration management request to a plurality of distribution requests on the basis of the load information of each processor acquired from the shared memory and the estimated processing time, determines a distribution destination processor for processing each of the plurality of distribution requests.

10 Claims, 24 Drawing Sheets

FIG. 3

MOUNTED DRIVE TABLE 121

| DRIVE ID | DRIVE TYPE | CONNECTED CONTROLLER ID | PROCESSOR LOAD WEIGHT |
|---|---|---|---|
| 1-1 | SAS | CONTROLLER A | 1 |
| 2-1 | SAS | CONTROLLER B | 1 |
| 3-1 | NVMe | CONTROLLER C | 2 |
| 3-2 | NVMe | CONTROLLER C | 2 |
| ... | ... | ... | ... |

PROCESSOR TABLE 122

| PROCESSOR ID | CONTROLLER ID | PROCESSOR STATUS | PROCESSOR OPERATING RATE | WRITE PENDING INFORMATION | DISTRIBUTION PROCESSING WEIGHT | PRIORITY |
|---|---|---|---|---|---|---|
| A-1 | CONTROLLER A | Nomal | 70% | 30MB | 0.21 | 2 |
| B-1 | CONTROLLER B | Nomal | 20% | 10MB | 0.72 | 1 |
| C-1 | CONTROLLER C | Nomal | 70% | 30MB | 0.11 | 3 |
| C-2 | CONTROLLER C | Failed | 100% | 0MB | 0 | 0 |
| ... | ... | ... | ... | ... | ... | ... |
| 1221 | 1222 | 1223 | 1224 | 1225 | 1226 | 1227 |

FIG. 5

RESPONSE SPEED TABLE 123

| RESPONSE SPEED ID | REQUEST TYPE | RESOURCE TYPE | RESPONSE TIME PER RESOURCE |
|---|---|---|---|
| 1 | GET | Volume | 2 msec |
| 2 | GET | Pool | 3 msec |
| 3 | GET | Drive | 1 msec |
| 4 | GET | User | 1 msec |
| ... | ... | ... | ... |

ACCEPTED REQUEST TABLE 124

| ACCEPTED REQUEST ID | DISTRIBUTION COUNT | REQUEST TYPE | TARGET RESOURCE | NUMBER OF TARGET RESOURCES |
|---|---|---|---|---|
| 1 | 2 | GET | Volume | 2500 |
| 2 | 4 | GET | Pool | 100 |
| 3 | 4 | GET | Pool | 100 |
| 4 | 1 | GET | HostGroup | 100000 |
| ... | ... | ... | ... | ... |

DISTRIBUTION REQUEST TABLE                                                    125

| DISTRIBUTION REQUEST ID | ACCEPTED REQUEST ID | PROCESSING PROCESSOR | NUMBER OF TARGET RESOURCES | GENERATION INFORMATION |
|---|---|---|---|---|
| 1 | 1 | B-1 | 2160 | 123457 |
| 2 | 1 | A-1 | 340 | 123457 |
| 3 | 2 | C-1 | ... | ... |
| 4 | 2 | C-2 | ... | ... |
| ... | ... | ... | ... | ... |
| 1251 | 1252 | 1253 | 1254 | 1255 |

FIG. 10

VOLUME CONFIGURATION INFORMATION TABLE　　　　41

| VolumeID | ClprID | Status | ByteFormatCapacty |
|---|---|---|---|
| 0 | 0 | NORMAL | 100GB |
| 1 | 0 | BLOCK | 100GB |
| ... | ... | ... | ... |
| 10200 | 20 | BUSY | 1TB |
| ... | ... | ... | ... |
| 65280 | 64 | NORMAL | 100TB |

POOL CONFIGURATION INFORMATION TABLE                                    42

| PoolID | VolumeCapacity | UsedCapacityRate | NumOfLdevs |
|--------|----------------|------------------|------------|
| 1      | 102400         | 5                | 10         |
| 2      | 102400         | 5                | 30         |
| ...    | ...            | ...              | ...        |
| 30     | 5242880        | 20               | 200        |
| ...    | ...            | ...              | ...        |
| 128    | 104857600      | 90               | 1000       |

HOST GROUP CONFIGURATION INFORMATION TABLE  43

| HostGroupID | HostGroupName | HostMode | iSCSIName |
|---|---|---|---|
| CL1-A,0 | host1 | OS1 | iqn.rest.example.of.iqn.host1 |
| CL1-A,1 | host2 | OS1 | iqn.rest.example.of.iqn.host2 |
| ... | ... | ... | ... |
| CL4-E,100 | host1000 | OS2 | iqn.rest.example.of.iqn.host1000 |
| ... | ... | ... | ... |
| CL8-R,254 | host10000 | OS2 | iqn.rest.example.of.iqn.host10000 |
| 431 | 432 | 433 | 434 |

FIG. 13

COPY GROUP CONFIGURATION INFORMATION TABLE 44

| CopyGroupName | PvolDeviceGroupName | SvolDeviceGroupName | PvolMuNumber |
|---|---|---|---|
| ... | ... | ... | ... |
| CG1 | CG1P | CG1S | 0 |
| ... | ... | ... | ... |

GENERATION INFORMATION TABLE  45

| REQUEST TYPE | GENERATION INFORMATION |
|---|---|
| Volume | 123456 |
| Pool | 5555 |
| HostGroup | 54321 |
| CopyGroup | 3333 |
| ... | ... |

451　　452

STORAGE APPARATUS AND CONFIGURATION MANAGEMENT REQUEST PROCESSING METHOD FOR STORAGE APPARATUS

CROSS-REFERENCE TO RELATED APPLICATION

The present application claims priority from Japanese application JP 2018-233920, filed on Dec. 13, 2018, the contents of which is hereby incorporated by reference into this application.

TECHNICAL FIELD

The present invention relates to a storage apparatus and a configuration management request processing method for the storage apparatus and is suited for application to, for example, a storage apparatus where a plurality of controllers, each of which has a plurality of processors, are caused to execute distribution processing of request processing.

BACKGROUND ART

Conventionally, a storage apparatus is designed so that a controller which performs I/O processing in response to an I/O request from a host is capable of executing configuration management processing, without requiring an administrative server, by creating volumes, deleting volumes, and so on in response to a configuration management request which has been input from an administrative terminal. Also, the controller has a plurality of processors and is designed to be capable of processing a plurality of requests at high speeds by having one processor execute distributed parallel processing for each request.

For example, PTL 1 discloses a storage system that plans processing for distributing a plurality of requests by setting some processor cores, among a plurality of processor cores which the controller has, for exclusive use for priority processing, thereby achieving the priority processing without causing any delay in the I/O processing.

CITATION LIST

Patent Literature

PTL 1: Japanese Patent No. 5909566

SUMMARY OF THE INVENTION

Problems to be Solved by the Invention

In recent years, storage apparatuses have come to be operated via cloud. So, even while a storage apparatus is in operation, configuration management processing is frequently performed in response to end users' requests. Therefore, there is a demand for enhancement of response performance of the configuration management processing.

However, regarding the technology described in PTL 1, processing content of processing executed by each processor core is determined in advance, so that a processor core is not selected as appropriate, depending on the situation, to execute the request distribution processing. Consequently, the resulting problems are the occurrence of delay in the configuration management processing and degradation of the response performance of the configuration management processing in circumstances, for example, where configuration management request data and response data are large and where the processing load of the I/O processing, which is preferentially processed over the configuration management processing, is high.

The present invention was devised in consideration of the above-described circumstances and aims at proposing a storage apparatus and a configuration management request processing method for the storage apparatus which are capable of enhancing the response performance of the configuration management processing.

Means to Solve the Problems

In order to solve the above-described problems, provided according to the present invention is a storage apparatus including a plurality of controllers, each of which has a plurality of processors for processing requests, and a storage device coupled to the controller, wherein the storage apparatus includes: an integration unit that integrally controls the plurality of controllers; and a shared memory that can be accessed from each processor for the plurality of controllers and stores configuration information of the storage apparatus including load information of each processor; wherein the integration unit: calculates estimated processing time of a configuration management request, which has been accepted from a management apparatus, from a request type and a target resource type of the configuration management request; and distributes the configuration management request to a plurality of distribution requests on the basis of the load information of each processor acquired from the shared memory and the estimated processing time, determines a distribution destination processor for processing each of the plurality of distribution requests, and transmits each of the distribution requests to the controller which has the distribution destination processor by designating the distribution destination processor; and wherein after receiving the distribution request, the controller causes the designated processor to process the distribution request.

Furthermore, provided according to the present invention is a configuration management request processing method for a storage apparatus including a plurality of controllers, each of which has a plurality of processors for processing requests, and a storage device coupled to the controller, wherein the storage apparatus includes: an integration unit that integrally controls the plurality of controllers; and a shared memory that can be accessed from each processor for the plurality of controllers and stores configuration information of the storage apparatus including load information of each processor; wherein the integration unit: calculates estimated processing time of a configuration management request, which has been accepted from a management apparatus, from a request type and a target resource type of the configuration management request; and distributes the configuration management request to a plurality of distribution requests on the basis of the load information of each processor acquired from the shared memory and the estimated processing time, determines a distribution destination processor for processing each of the plurality of distribution requests, and transmits each of the distribution requests to the controller which has the distribution destination processor by designating the distribution destination processor; and wherein after receiving the distribution request, the controller causes the designated processor to process the distribution request.

When this storage apparatus and the configuration management request processing method for the storage apparatus are employed, it is possible to reduce performance interference between the configuration management processing and the I/O processing and suppress a processing speed reduction of the configuration management processing.

Advantageous Effects of the Invention

The storage apparatus and the configuration management request processing method for the storage apparatus which are capable of enhancing the response performance of the configuration management processing can be implemented according to the present invention.

BRIEF DESCRIPTION OF DRAWINGS

FIG. 3 is a diagram illustrating a structure example of a mounted drive table;

FIG. 4 is a diagram illustrating a structure example of a controller table;

FIG. 5 is a diagram illustrating a structure example of a response speed table;

FIG. 6 is a diagram illustrating a structure example of an accepted request table;

FIG. 7 is a diagram illustrating a structure example of a distribution request table;

FIG. 10 is a diagram illustrating a structure example of a Volume configuration information table;

FIG. 11 is a diagram illustrating a structure example of a Pool configuration information table;

FIG. 12 is a diagram illustrating a structure example of a Host Group configuration information table;

FIG. 13 is a diagram illustrating a structure example of a Copy Group configuration information table;

FIG. 14 is a diagram illustrating a structure example of a generation information table;

DESCRIPTION OF EMBODIMENTS

Figure 1:
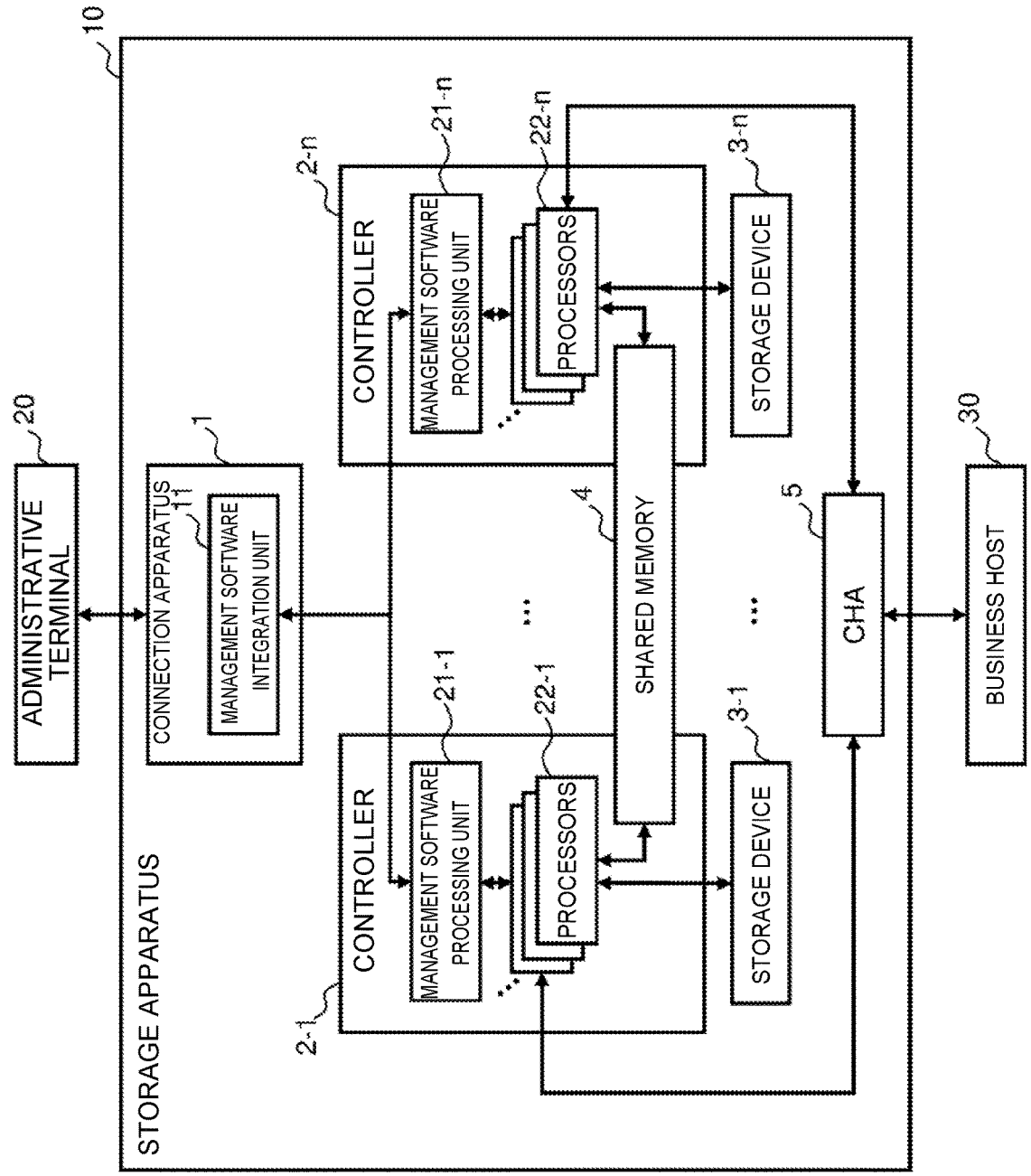
FIG. 1 is a diagram illustrating a configuration example of a storage apparatus according to a first embodiment.

Embodiments of the present invention will be described below in detail with reference to the drawings. The following embodiments do not limit the present invention and not all elements or their combinations described in the embodiments are necessarily indispensable as the solution of the present invention. Furthermore, the same reference numerals in the respective drawings to explain the following embodiments indicate constituent elements or processing equipped with the same or similar functions, so that any subsequent explanations will be omitted. Furthermore, a part or whole of every embodiment and every variation can be combined within the range of the technical idea of the present invention and within the range of conformity.

In the following explanation, various kinds of information may sometimes be explained by using the expression "aaa tables," but each piece of the various kinds of information may also be expressed by data structures other than tables. The "aaa tables" may be sometimes called "aaa information" in order to indicate that such information does not depend on the data structures. The "aaa tables" or "aaa information" is stored in storage areas reserved in storage resources (such as a memory).

Moreover, in the following explanation, a processing flow may be explained by referring to a "program" as a subject. The program is executed by a processor (such as a CPU [Central Processing Unit]) to execute predetermined processing by using at least one of storage resources (such as a memory) and communication interfaces as appropriate. For example, an element explained or illustrated as an "xxx program" is a processing unit that executes predetermined processing by having a processor use the storage resource or the communication interface and analyze and execute a program source. Accordingly, the subject of the processing by the program may be the processor or an apparatus which has that processor.

Furthermore, a part or whole of the processing executed by the processor may be processed by a hardware circuit. The program which specifies the processing to be executed by the processor may be, for example, acquired from an external apparatus via a network or acquired via a storage medium, and then executed by the processor.

Furthermore, in the following explanation when explaining elements of the same type by distinguishing them from each other, reference numerals with branch numbers attached thereto like "xxx10a," "xxx10n," "xxx11Ba," "xxx11Bn," "xxx12-1," and "xxx12-n" will be used. When explaining the elements of the same type without distinguishing them from each other, only the common parts in the reference numerals like "xxx10," "xxx11B," and "xxx12" will be sometimes used.

(1) First Embodiment (1-1) Configuration of Storage Apparatus According to First Embodiment FIG. 1 is a diagram illustrating a configuration example of a storage apparatus according to a first embodiment. A storage apparatus 10 according to the first embodiment includes a connection apparatus 1, n pieces (n is an integer equal to or more than 2) of controllers 2-1 to 2-n, n pieces of storage devices 3-1 to 3-n, and a CHA (channel adapter) 5.

The connection apparatus 1 is a communication interface for the storage apparatus 10 to connect to an administrative terminal 20. The connection apparatus 1 has a management software integration unit 11.

The controller 2 has a management software processing unit 21 and a plurality of processors 22. Also, a storage device 3-i is connected to a controller 2-i (i=1 to n) which is a storage controller.

The management software integration unit 11 determines a processor 22 of an optimum controller 2 for executing distribution processing of configuration management processing on the basis of configuration information and load information of the storage apparatus 10, and the content of a configuration management request(s) which has been input from the administrative terminal 20. The management software integration unit 11 designates a processor 22 for executing the configuration management processing for a controller 2 of the determined processor 22 and transmits distribution requests which are obtained by dividing the configuration management request.

The controller 2 executes the distribution requests received from the management software integration unit 11 by having the designated processor 22 access the storage device 3 and the shared memory 4 and returns the execution results to the management software integration unit 11. A plurality of controllers 2-1 to 2-n have the same configuration and the same processing is executed with respect to one management software integration unit 11.

Each storage device 3 is composed of one or more drive devices. Each storage device 3 is accessed from the processors via a drive interface (which is not illustrated in the drawing). The drive devices are, for example, HDDs (Hard Disk Drives) which use storage media such as magnetic disks, and SSDs (Solid State Drives) which use storage media such as flash memories.

The shared memory 4 is a memory shared by the controllers 2 and is a RAM (Random Access Memory) which is also accessible from the processors 22 of every controller 2. When executing request processing of a configuration management request and an I/O request, the processor 22 accesses the shared memory 4 and acquires or updates information retained in the shared memory 4.

Moreover, the shared memory 4 stores, as described later with reference to FIG. 9 to FIG. 15, various kinds of configuration information tables of the storage apparatus 10 and a generation information table which retains generation information of configuration information registered in each configuration information table. The generation information will be described later. Furthermore, the shared memory 4 includes a cache region to temporarily store write data which are to be written to the storage device 3 in response to an I/O request from a business host 30, and read data which have been read from the storage device 3. This cache region is reserved for each processor 22.

The CHA 15 is a communication interface for the storage apparatus 10 to connect to the business host 30. The I/O request which has been input from the business host 30 is transmitted to a designated processor 22. The designated processor 22 executes the I/O processing on the storage device 3 while using the cache region in the shared memory 4 and returns the execution result of the I/O processing to the business host 30.

Figure 2:
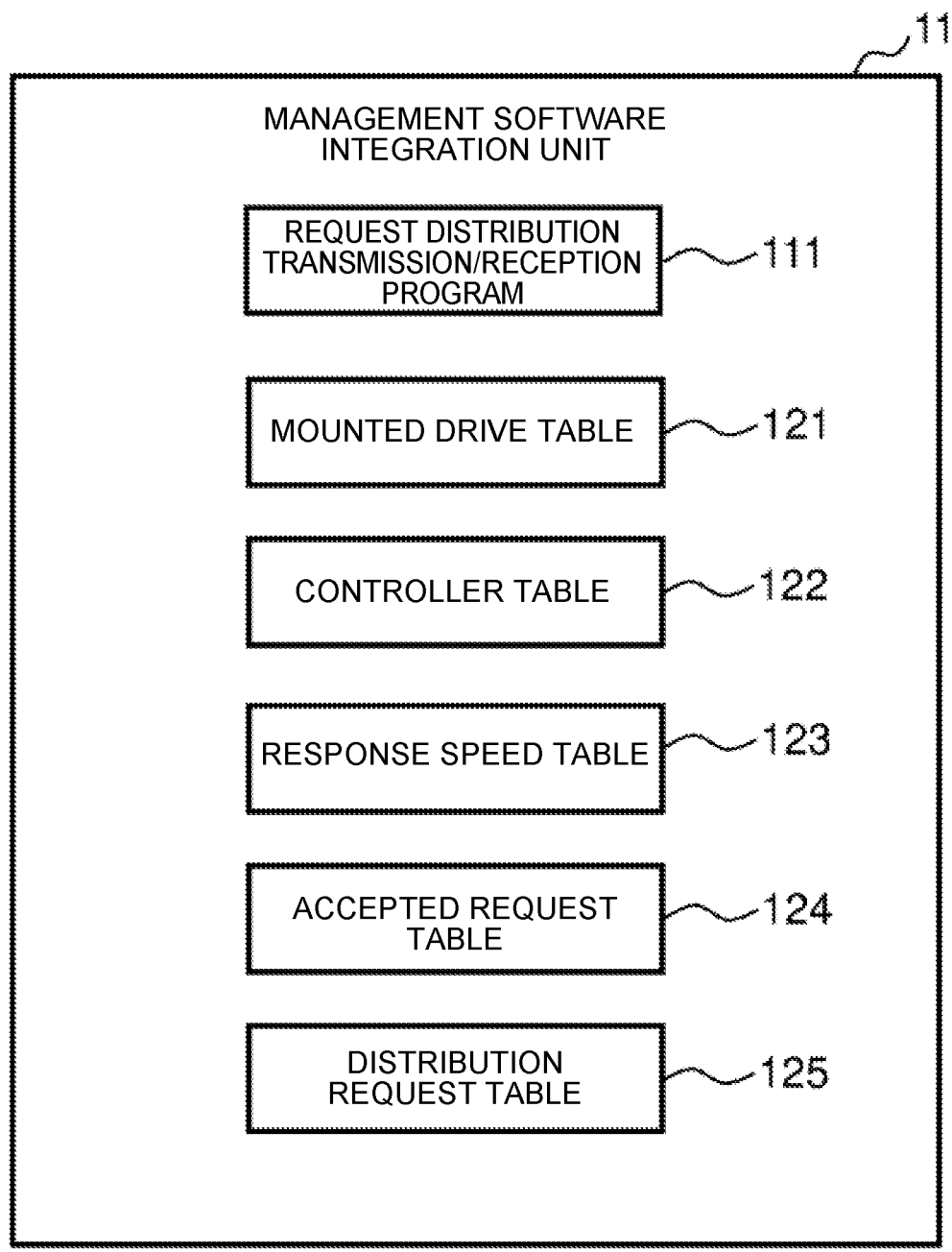
FIG. 2 is a diagram illustrating a configuration example of a management software integration unit for the storage apparatus according to the first embodiment.

(1-2) Configuration of Management Software Integration Unit According to First Embodiment FIG. 2 is a diagram illustrating a configuration example of the management software integration unit for the storage apparatus according to the first embodiment. The management software integration unit 11 includes a request distribution transmission/reception program 111, a mounted drive table 121, a controller table 122, a response speed table 123, an accepted request table 124, and a distribution request table 125.

The request distribution transmission/reception program 111 accepts a configuration management request, determines a method for distributing the configuration management request to the controllers 2, transmits "distribution requests," which are obtained by dividing the configuration management request, to the management software processing unit 21, and receives and combines the execution results of the configuration management processing according to the distribution requests from the management software processing unit 21.

FIG. 3 is a diagram illustrating a structure example of the mounted drive table. The mounted drive table 121 is a table for managing the drive devices which constitute each storage device 3. Records of the mounted drive table 121 include, as field values, a drive ID 1211, a drive type 1212, a connected controller ID 1213, and a processor load weight 1214.

Referring to an example of FIG. 3, the drive type 1212 of a drive device whose drive ID 1211 is "1-1" is "SAS" and the connected controller ID 1213 of a controller 2 to which the relevant drive is connected is "controller A." Furthermore, for example, the drive type 1212 of drive devices whose drive ID's 1211 are "3-1" and "3-2" is "NVMe" and the connected controller ID 1213 of a controller 2 to which the relevant drives are connected is "controller C." The drives whose drive ID's 1211 are "3-1" and "3-2" are a plurality of drives which constitute the storage device 3 connected to the same controller 2.

The processor load weight 1214 is determined in advance according to the drive type 1212. For example, when the drive type 1212 is "SAS," the processor load weight 1214 is "1"; and when the drive type 1212 is "NVMe," load when writing data is higher than that of SAS and, therefore, the processor load weight 1214 is "2," which is a larger value than that of SAS.

FIG. 4 is a diagram illustrating a structure example of the controller table. The controller table 122 is a table for managing the configuration of the controllers 2 and the load status of each processor. Records of the controller table 122 include, as field values, a processor ID 1221, a controller ID 1222, a processor status 1223, a processor operating rate 1224, Write Pending information 1225, a distribution processing weight 1226, and a priority 1227.

The processor ID 1221 and the controller ID 1222 are information indicating the processors 22 which constitute the controllers 2. An example of FIG. 4 shows that: a controller 2 whose controller ID 1222 is "controller A" is equipped with a processor 22 whose processor ID 1221 is "A-1", and a controller 2 whose controller ID 1222 is "controller C" is equipped with processors 22 whose processor ID's 1221 are "C-1" and "C-2."

The processor status 1223 indicates: "Normal" when the processor 22 identified by the processor ID 1221 is in normal operation; and "Failed" when the processor 22 identified by the processor ID 1221 is not in normal operation.

The processor operating rate 1224, the Write Pending information 1225, the distribution processing weight 1226, and the priority 1227 are: information based on a processor operating rate and Write Pending information of each processor 22, which the request distribution transmission/reception program 111 has received from the controller 2; and information to be updated by the request distribution transmission/reception program 111 as described later.

The processor operating rate 1224 is a usage rate of the relevant processor 22. The Write Pending information 1225 is information indicating a data volume which is waiting to be written by the relevant processor 22 to the storage device 3 and which is stored in the cache region in the shared memory 4. The distribution processing weight 1226 is information calculated according to Expression (1) described later. The priority 1227 is information representing the priority order assigned to each processor in a descending order of the distribution processing weight 1226 in the controller table 122.

Incidentally, when the processor status 1223 of the processor 22 is "Failed," the relevant processor 22 is not in normal operation. So, regarding processing of the request distribution transmission/reception program upon receiving the processor operating rate and the Write Pending information which will be described later with reference to FIG. 16, "100%," "0 MB," "0," and "0" are registered in the processor operating rate 1224, the Write Pending information 1225, the distribution processing weight 1226, and the priority 1227, respectively.

FIG. 5 is a diagram illustrating a structure example of the response speed table. The response speed table 123 is a table for managing response speeds of the request processing of each configuration management request type and each target resource type. Records of the response speed table 123 include, as field values, a response speed ID 1231, a request type 1232, a resource type 1233, and response time per resource 1234. Regarding the request type 1232 of a configuration management request, there are "POST" and other types besides "GET" (acquisition of the configuration information) indicated in FIG. 5. Also, regarding the resource type 1233, there are "Host Group," "Parity Group," and other resource types besides "Volume," "Pool," "Drive," and "User" indicated in FIG. 5.

The content of the configuration management processing varies for each configuration management request and the configuration information, which is defined for each target resource for the configuration management request, and the number of target resources also vary, so that the response time for the configuration management request varies. Therefore, the response time per resource of the request processing of the configuration management request is managed for each request type and for each resource type.

An example of FIG. 5 shows that the response time per resource 1234 of the response time per resource 1234 with the response speed ID 1231 "1," the request type 1232 "GET (acquisition of the configuration information)," and the resource type 1233 "Volume" is "2 msec."

FIG. 6 is a diagram illustrating a structure example of the accepted request table. The accepted request table 124 is a table for managing a distribution count and the number of target resources which are determined by the request distribution transmission/reception program 111 for each configuration management request accepted from the administrative terminal 20 by designating the request type and the target resource. Records of the accepted request table 124 include, as field values, an accepted request ID 1241, a distribution count 1242, a request type 1243, a target resource 1244, and the number of target resources 1245.

FIG. 7 is a diagram illustrating a structure example of the distribution request table. The distribution request table 125 is a table for managing the accepted requests managed by the accepted request table 124 and the distribution requests on which the distribution processing is executed by a distribution method determined by the request distribution transmission/reception program 111, by associating the accepted requests with the distribution requests each other. Furthermore, the distribution request table 125 is a table for managing a processing processor for each distribution request, the number of target resources for the relevant distribution request, and the generation information of the processing result of the relevant distribution request.

Records of the distribution request table 125 include, as field values, a distribution request ID 1251, an accepted request ID 1252, a processing processor 1253, the number of target resources 1254, and generation information 1255.

The relationship between the accepted request table 124 and the distribution request table 125 will be explained with reference to FIG. 6 and FIG. 7 by taking specific examples.

A request whose accepted request ID 1241 in the accepted request table 124 is "1" is a configuration management request regarding which the distribution count 1242 is "2," the request type 1243 is "GET," the target resource 1244 is "Volume," and the number of target resources 1245 is "2500."

The configuration management request with the accepted request ID 1241 "1" is distributed to two distribution requests whose distribution request ID's 1251 are "1" and "2" and which are then registered in the distribution request table 125. Then, the accepted request ID 1252 of the distribution request table 125 is associated with the accepted request ID 1241 of the accepted request table 124.

Furthermore, the processing processor 1253 of the distribution request with the distribution request ID 1251 "1" is "B-1", and the processing processor 1253 of the distribution request with the distribution request ID 1251 "2" is "A-1." Referring to FIG. 4, a processing processor with the processor ID 1221 "A-1" is a processor 22 which is "controller A"; and a processing processor with the processor ID 1221 "B-1" is a processor 22 which is "controller B."

(1-3) Configuration of Controller According to First Embodiment

Figure 8:
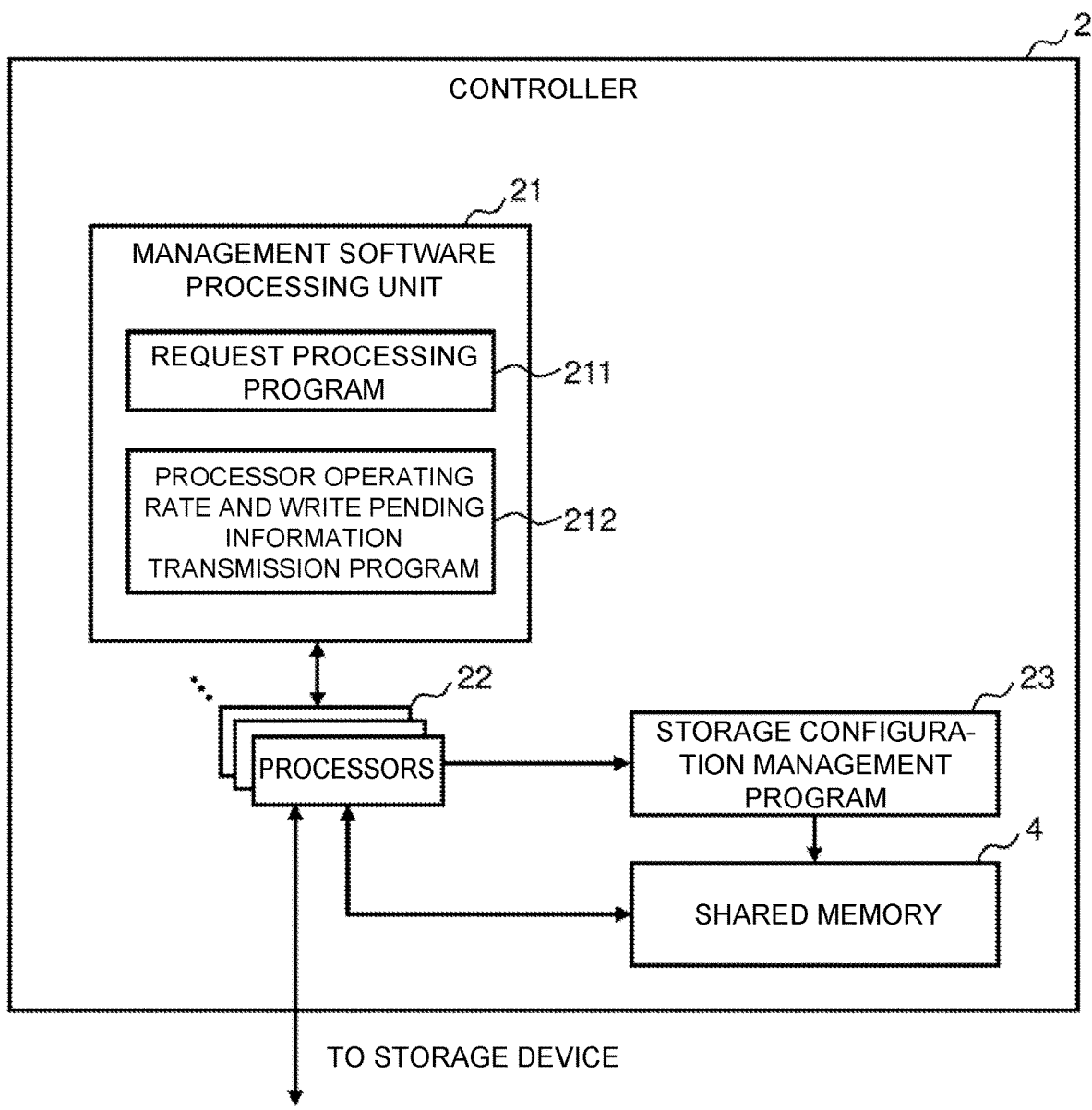
FIG. 8 is a diagram illustrating a configuration example of a controller for the storage apparatus according to the first embodiment.

FIG. 8 is a diagram illustrating a configuration example of a controller for the storage apparatus according to the first embodiment. The controller 2 will be explained below and the same applies to all the controllers 2-1 to 2-n.

The controller 2 includes the management software processing unit 21, a plurality of processors 22, a storage configuration management program 23, and the shared memory 4.

The management software processing unit 21 includes a request processing program 211 and a processor operating rate and Write Pending information transmission program 212.

The request processing program 211 executes processing of the distribution requests accepted from the request distribution transmission/reception program 111 of the management software integration unit 11.

The processor operating rate and Write Pending information transmission program 212 regularly transmits the processor operating rate of each of the plurality of processors 22, which the relevant controller 2 has, and a data volume waiting to be written to the storage device 3 connected to the relevant controller 2 (Write Pending information) to the request distribution transmission/reception program 111. The processor operating rates and the Write Pending information are saved in the shared memory 4 and are regularly updated to the latest information by the storage configuration management program 23.

The storage configuration management program 23 manages the configuration information and the load information of the storage apparatus 10. The storage configuration management program 23 monitors the configuration of the storage apparatus 10 and the load status and regularly saves the latest configuration information and load information in a storage configuration information table (which is not illustrated in the drawing) in the shared memory 4.

The configuration information of the storage apparatus 10 includes "drive information" which associates the drive ID of a drive device, which the storage apparatus 10 has, the drive type of that drive device, and the controller ID of a controller 2 to which that drive device is connected, with each other.

Also, the configuration information of the storage apparatus 10 includes "controller information" which associates the processor ID of a processor 22, which the storage apparatus 10 has, the controller ID of a controller 2 to which that processor 22 is connected, and the processor status of that processor 22 with each other.

Furthermore, the load information of the storage apparatus 10 includes the "processor operating rate and Write Pending information" of each processor 22.

The storage configuration management program 23 saves the "drive information," the "controller information," and the "processor operating rate and Write Pending information" in the storage configuration information table (which is not illustrated in the drawing) of the shared memory 4 and regularly updates them.

(1-4) Information Stored in Shared Memory According to First Embodiment

Figure 9:
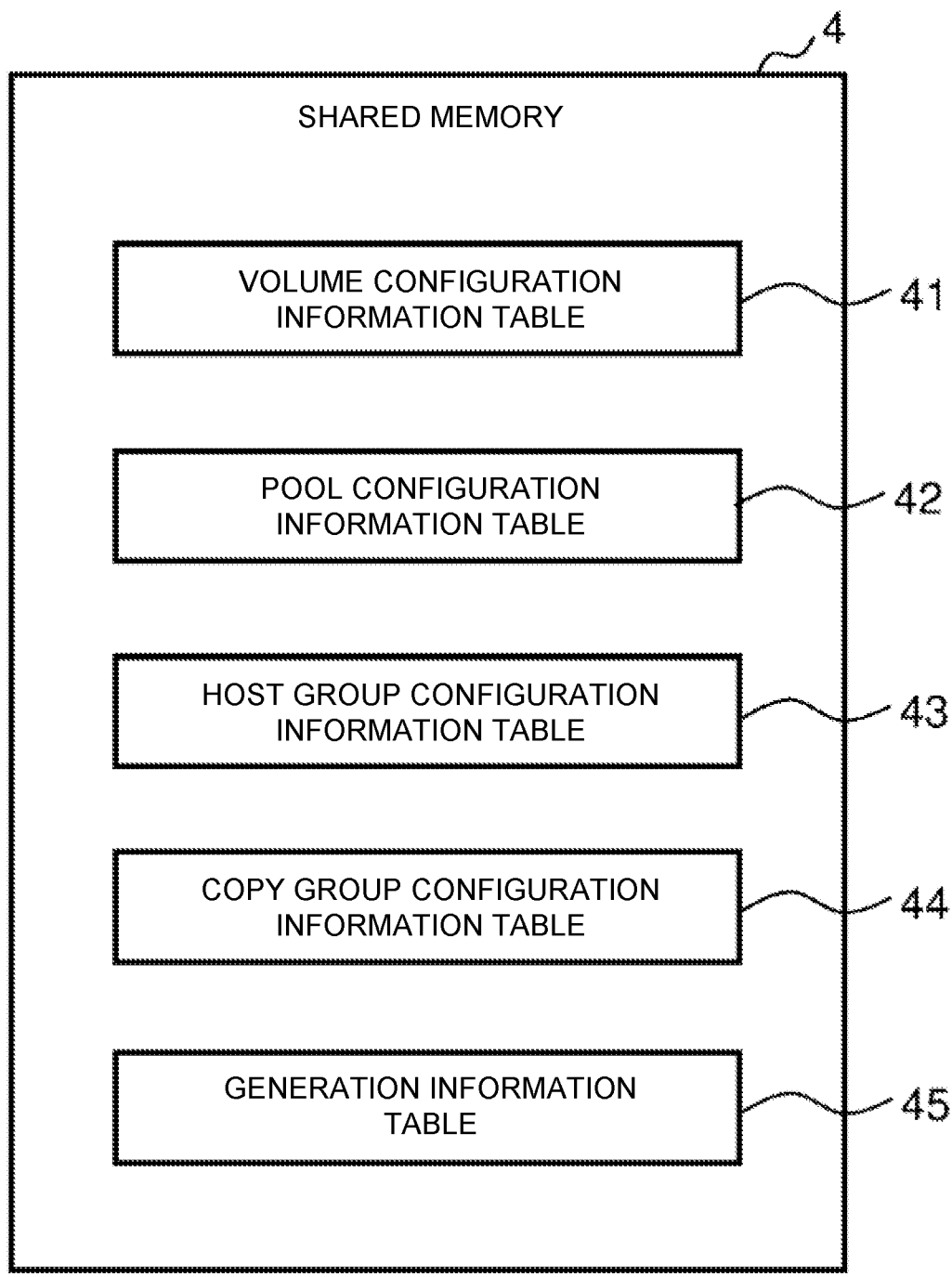
FIG. 9 is a diagram illustrating information examples stored in a shared memory for the storage apparatus according to the first embodiment.

FIG. 9 is a diagram illustrating information examples stored in the shared memory for the storage apparatus according to the first embodiment. The shared memory 4 stores, for example, various kinds of configuration information tables including a Volume configuration information table 41, a Pool configuration information table 42, a Host Group configuration information table 43, and a Copy Group configuration information table 44, as well as a generation information table 45.

(1-5) Structure of Volume Configuration Information Table

FIG. 10 is a diagram illustrating a structure example of the Volume configuration information table. The Volume configuration information table 41 is a table for managing the configuration information for each Volume. Records of the Volume configuration information table 41 include, as field values, a Volume ID 411, a Clpr ID 412, a Status 413, and a Byte Format Capacity 414.

The Volume ID 411 is the number for identifying the relevant Volume. The Clpr ID 412 indicates the number of logical divisions of the cache region in the memory which is allocated to the relevant Volume. The Status 413 indicates the status of the relevant Volume. Regarding the Status 413, "NORMAL" indicates that the relevant Volume is in a normal state; "BLOCKED" indicates that the relevant Volume is in an inaccessible state; and "BUSY" indicates a state where an access load of the relevant Volume is equal to a specified value or more, that is, in a high state. The Byte Format Capacity 414 indicates the capacity of the relevant Volume.

(1-6) Structure of Pool Configuration Information Table

FIG. 11 is a diagram illustrating a structure example of the Pool configuration information table. The Pool configuration information table 42 is a table for managing the configuration information of each Pool. Records of the Pool configuration information table 42 include, as field values, a Pool ID 421, a Volume Capacity 422, a Used Capacity Rate 423, and the Num Of Ldevs 424.

The Pool ID 421 is the number for identifying the relevant Pool. The Volume Capacity 422 indicates the capacity of the relevant Pool. The Used Capacity Rate 413 indicates a usage rate of the capacity of the relevant Pool. The Num Of Ldevs 424 indicates the number of logical devices (logical drives) in the relevant Pool.

(1-7) Structure of Host Group Configuration Information Table

FIG. 12 is a diagram illustrating a structure example of the Host Group configuration information table. The Host Group configuration information table 43 is a table for managing the configuration information for each Host Group. Records of the Host Group configuration information table 43 includes, as field values, a Host Group ID 431, a Host Group Name 432, a Host Mode 433, and an iSCSI Name 424.

The Host Group ID 431 is the number for identifying the relevant Host Group. The Host Group Name 432 indicates the name for identifying the relevant Host Group. The Host Mode 433 indicates an OS (Operating System) type of the relevant Host Group. The iSCSI Name 424 indicates the name for identifying an iSCSI node of the relevant Host Group.

(1-8) Structure of Copy Group Configuration Information Table

FIG. 13 is a diagram illustrating a structure example of the Copy Group configuration information table. The Copy Group configuration information table 44 is a table for managing the configuration information of each Copy Group. Records of the Copy Group configuration information table 44 include, as field values, a Copy Group ID 441, a Pvol Device Group Name 442, a Svol Device Group Name 443, and a Pvol Mu Number 444.

The Copy Group ID 441 is the number for identifying the relevant Copy Group. The Pvol Device Group Name 442 indicates the name for identifying a copy source device group of the relevant Copy Group. The Svol Device Group Name 443 indicates the name for identifying a copy destination device group of the relevant Copy Group. The Pvol Mu Number 444 indicates information for identifying physical resources, such as a CPU, which are uniquely allocated to the relevant Copy Group.

(1-9) Structure of Generation Information Table

FIG. 14 is a diagram illustrating a structure example of the generation information table. The generation information table 45 is a table for managing the generation information of the configuration information of each resource type. Records of the generation information table 45 include, as field values, a resource type 451 and generation information 452. The generation information 452 is a numerical value which is incremented by one every time a configuration change is made once to the resource of the relevant resource type; and a larger numerical value indicates that the configuration information of the relevant resource stored in the configuration information table is information of a newer generation.

Figure 15:
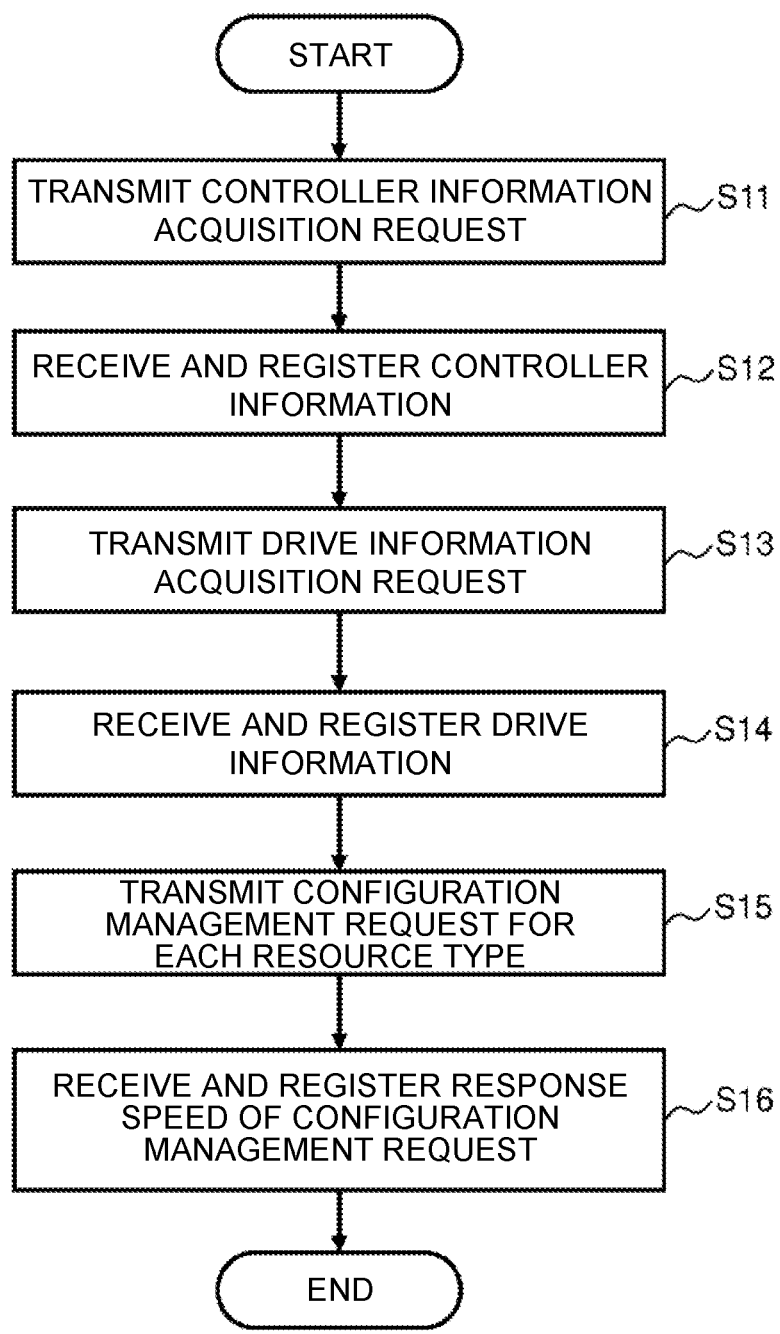
FIG. 15 is a flowchart illustrating processing upon activating a request distribution transmission/reception program.

(1-10) Processing Upon Activating Request Distribution Transmission/Reception Program FIG. 15 is a flowchart illustrating processing upon activating the request distribution transmission/reception program. The processing upon activating the request distribution transmission/reception program is processing executed upon activation of the storage apparatus 10.

The request distribution transmission/reception program 111 firstly transmits a controller information acquisition request to the request processing program 211 of any one of the controllers 2 (step S11). The request processing program 211 which has received the controller information acquisition request acquires the "controller information" from the shared memory 4 and transmits it to the request distribution transmission/reception program 111.

Next, the request distribution transmission/reception program 111 registers the "controller information," which has been received from the request processing program 211 in response to the controller information acquisition request transmitted in step S11, in the controller table 122 (step S12).

Specifically speaking, regarding each one record of the received "controller information," the request distribution transmission/reception program 111 stores the processor ID in the processor ID 1221 of the controller table 122, stores the controller ID in the controller ID 1222, and stores the processor status in the processor status 1223, thereby generating each record of the controller table 122.

Then, the request distribution transmission/reception program 111 transmits a drive information acquisition request to the request processing program 211 of any one of the controllers 2 (step S13). The request processing program 211 which has received the drive information acquisition request acquires the "drive information" from the shared memory 4 and transmits it to the request distribution transmission/reception program 111.

Subsequently, the request distribution transmission/reception program 111 registers the "drive information," which has been received from the request processing program 211 according to the drive information acquisition request transmitted in step S13, in the mounted drive table 121 (step S14).

Specifically speaking, regarding each one record of the received "drive information," the request distribution transmission/reception program 111 stores the drive ID in the drive ID 1211 of the mounted drive table 121, stores the drive type in the drive type 1212, and stores the connected controller ID in the connected controller ID 1213. Then, the request distribution transmission/reception program 111 stores the processor load weight, which is determined in advance according to the drive type, in the processor load weight 1214, thereby generating each record of the mounted drive table 121.

Next, the request distribution transmission/reception program 111 transmits a configuration management request of each request type and each resource type to the request processing program 211 of any one of the controllers 2 (step S15). The request processing program 211 which has received the configuration management request in step S15 executes the configuration management processing for each designated request type and each designated resource type and estimates the response time per resource for each request type and each resource type.

For example, when the request type 1232 is "GET" and the resource type 1233 is "Volume" as indicated in a record of the response speed ID 1231 in the response speed table 123 in FIG. 5, let us assume regarding the processing upon activating the request distribution transmission/reception program 111 that the response time when 10000 pieces of Volume configuration information were acquired from the Volume configuration information table 41 in the shared memory 4 was 20 seconds.

Since the response time is proportional to the data volume of the configuration information, an estimated value of the response time to acquire the Volume configuration information per one piece of the configuration information is calculated based the calculation of 20 sec/10000 pieces of information=2 msec. This calculation result of "2 msec" is stored in the response time per resource 1234 of the record of the response speed ID 1231 in the response speed table 123.

On the other hand, for example, when a request for the acquisition of 6000 pieces of the Volume configuration information (GET) is accepted from the administrative terminal 20, the processing time of the accepted request can be estimated as 6000 pieces of information×2 msec=120 seconds according to the record whose response speed ID 1231 in the response speed table 123 is "1."

Incidentally, the request processing program 211 may estimate the response time of the configuration management request on the basis of the response time per specified data volume of the request data or the response data for each request type and each resource type.

The request processing program 211 which has estimated the response time of the configuration management request for each request type and each resource type in response to the reception of the configuration management request transmits the estimated response time per resource for each request type and each resource type to the request distribution transmission/reception program 111.

Next, the request distribution transmission/reception program 111 registers the response time per resource for each request type and each resource type, which has been received from the request processing program 211, in the response speed table 123 (step S16).

Specifically speaking, the request distribution transmission/reception program 111 stores the received request type in the request type 1232 of the response speed table 123, stores the resource type in the resource type 1233, stores the response time in the response time per resource 1234, and assigns the response speed ID, thereby generating each record of the response speed table 123.

Incidentally, the processing in step S15 and S16 is not limited to upon the activation of the storage apparatus 10, but may be executed regularly.

Figure 16:
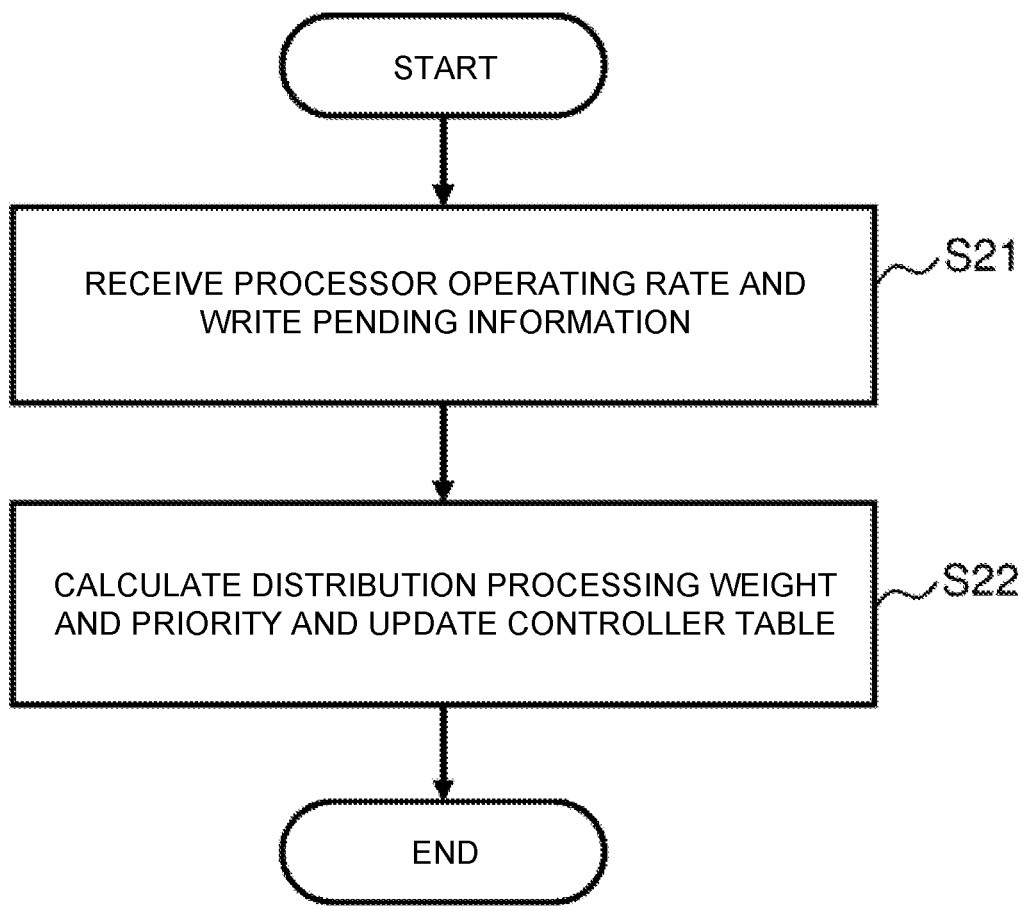
FIG. 16 is a flowchart illustrating processing of the request distribution transmission/reception program upon receiving a processor operating rate and Write Pending information.

(1-11) Processing Upon Receiving Processor Operating Rate and Write Pending Information FIG. 16 is a flowchart illustrating processing of the request distribution transmission/reception program upon receiving the processor operating rate and the Write Pending information. The processing of the request distribution transmission/reception program 111 upon receiving the processor operating rate and the Write Pending information is processing executed after the activation of the request distribution transmission/reception program 111 every time the processor operating rate and the Write Pending information are received from the processor operating rate and Write Pending information transmission program 212.

The request distribution transmission/reception program 111 firstly receives the processor operating rate and the Write Pending information in each controller 2 from the processor operating rate and Write Pending information transmission program 212 of the management software processing unit 21 for the controller 2 (step S21).

Next, the request distribution transmission/reception program 111 calculates the distribution processing weight and the priority from the processor operating rate and the Write Pending information received in step S21 and the information of the mounted drive table 121 and thereby updates the controller table 122 (step S22).

As an explanation will be provided by taking a specific example, let us assume that the request distribution transmission/reception program 111 has received "70%" as the "processor operating rate" and "30 MB" as the "Write Pending information" from the processor operating rate and Write Pending information transmission program 212 with respect to the processor 22, whose "processor ID" is "A-1," for the controller 2 whose "controller ID" is "controller A." Under this circumstance, the request distribution transmission/reception program 111 calculates the "distribution processing weight" from the load weight 1214 of the mounted drive table 121 and according to the following Expression (1). Incidentally, a "reference memory amount" in the following Expression (1) is a predetermined value such as "100 MB."

[Math. 1]

$$\text{DISTRIBUTION } PROCESSINNG \text{ WEIGHT} = \frac{100 - \text{PROCESSOR OPERATING RATE}}{100} \times \frac{100 - \text{WRITE PENDING INFORMATION}}{\text{REFERENCE MEMORY AMOUNT}} \quad (1)$$
$$\text{PROCESSOR LOAD WEIGHT}$$

Specifically speaking, the request distribution transmission/reception program 111 refers to the mounted drive table 121 based on the "controller ID," which is "controller A," and acquires the "processor load weight" which is "1" corresponding to "controller A." Then, the request distribution transmission/reception program 111 substitutes "70%" as the "processor operating rate," "30 MB" as the "Write Pending information," "100 MB" as "the reference memory amount," and "1" as the "processor load weight" in the above-mentioned Expression (1), thereby calculating the distribution processing weight=0.21.

Then, the request distribution transmission/reception program 111 updates the processor operating rate 1224, the Write Pending information 1225, and the distribution processing weight 1226 of the record of the "processor ID" "A-1" in the controller table 122 with "70%" as the "processor operating rate," "30 MB" as the "Write Pending information," and "0.21" as the "distribution processing weight." The same applies to other "processor ID's."

Furthermore, the request distribution transmission/reception program 111 updates the priority 1227 in a descending order of the distribution processing weight 1226 with respect to all records of the controller table 122.

Figure 17:
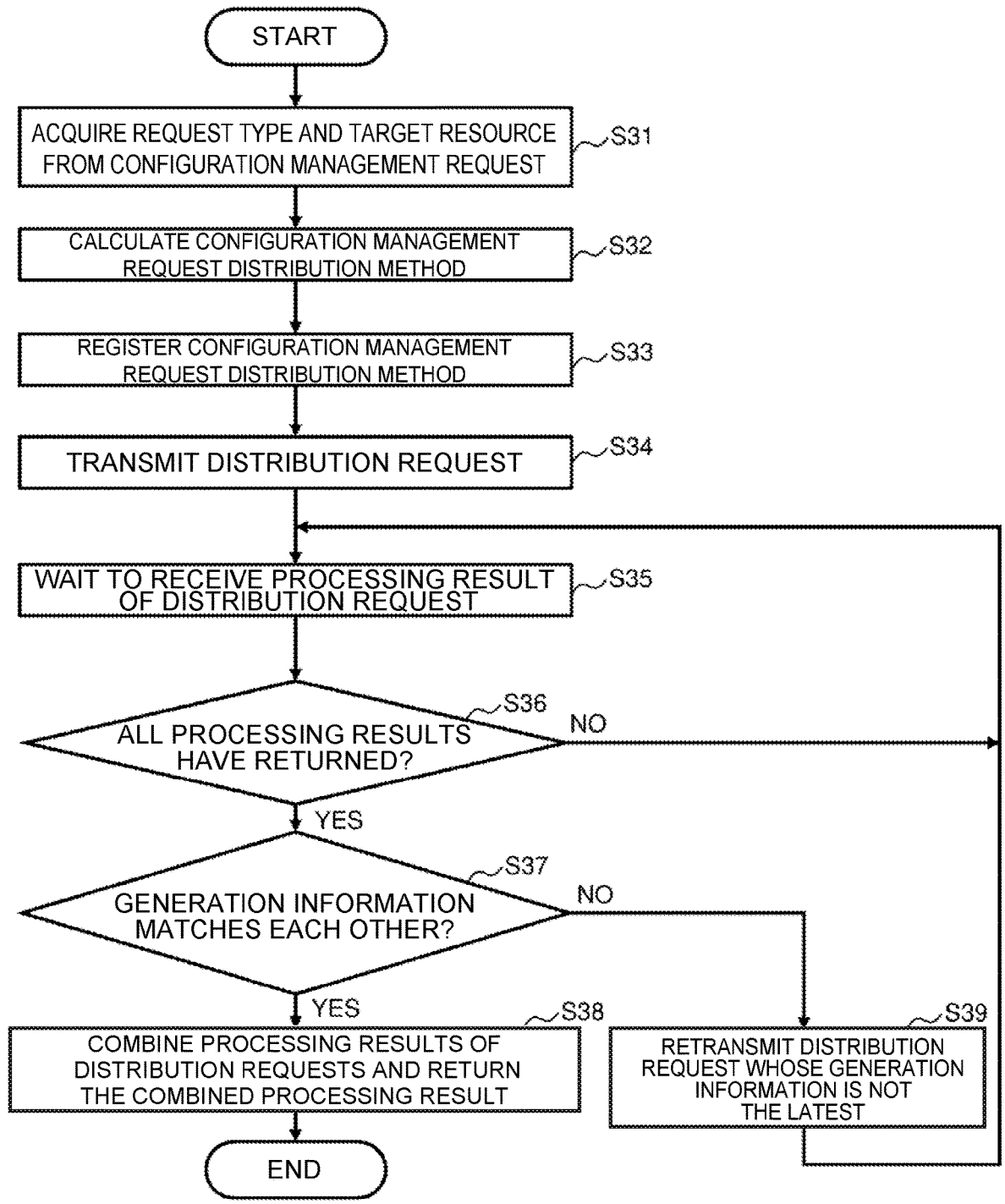
FIG. 17 is a flowchart illustrating processing of the request distribution transmission/reception program upon accepting a request.

(1-12) Processing of Request Distribution Transmission/Reception Program Upon Accepting Request FIG. 17 is a flowchart illustrating processing of the request distribution transmission/reception program upon accepting a request(s). The processing of the request distribution transmission/reception program 111 upon accepting the request(s) is processing executed every time a configuration management request is received from the administrative terminal 20.

The request distribution transmission/reception program 111 firstly analyzes the configuration management request received from the administrative terminal 20 and acquires the request type and the target resource (step S31). For example, let us assume that the request distribution transmission/reception program 111 has received a configuration management request, regarding which the request type is "GET," the target resource is "Volume," and the number of target resources is "2500 pieces," from the administrative terminal 20.

Next, the request distribution transmission/reception program 111 calculates the configuration management request distribution method (distribution requests) based on the reference response speed from the information acquired in step S31 (step S32). The reference response speed herein used means an upper limit value to be satisfied by the response time of the configuration management processing for the configuration management request and is assumed to be, for example, 3 seconds.

For example, the request distribution transmission/reception program 111 refers to the response speed table 123 and acquires the response time per resource "2 msec" corresponding to the request type "GET" and the resource type "Volume." Then, the "estimated response time" when the request processing of the configuration management request, regarding which the request type is "GET," the target resource is "Volume," and the number of target resources is "2500 pieces," is executed by one processor is estimated as 2500 pieces×0.002 seconds=5 seconds. Since the reference response speed is 3 seconds, it is necessary to distribute the number of target resources to two processors 22 and make them execute the processing in order to make the estimated response time equal to or lower than the reference response speed.

Therefore, the request distribution transmission/reception program 111 causes processor B-1 for controller B with the priority 1227 "1" and processor A-1 for controller A with the priority "2" in the controller table 122 to execute the processing for distributing the number of target resources of the configuration management request (GET). Specifically speaking, the distribution count for the number of target resources is determined as "2."

Then, when causing processor B-1 and processor A-1, respectively, to execute the processing for distributing "2500 pieces" of the number of target resources for the configuration management request, the request distribution transmission/reception program 111 calculates a "target resource sorting count (X)" according to the following Expression (2) to find the number of target resources to be sorted to the processor with the priority "X." As the request distribution transmission/reception program 111 divides the 2500 pieces of the configuration management request into two distribution requests, it executes the calculation according to the following Expression (2) with respect to the processors whose priority X is $1^{st}$ and $2^{nd}$.

[Math. 2]

$$\text{TARGET RESOURCE SORTING COUNT}(x) = \frac{\text{DISTRIBUTION COUNT} \times \text{REFERENCE RESPONSE SPEED} \times \text{DISTRIBUTION } PROCESSINNG \text{ WEIGHT}}{\text{RESPONSE TIME PER RESOUCE}} \quad (2)$$

The target resource sorting count (X=1) for processor B-1 with the priority "$1^{st}$" is calculates as "2160 pieces" according to the above-mentioned Expression (2) where the distribution count is "2," the reference response speed is "3 seconds," the distribution processing weight is "0.71," and the response time per resource is "2 msec." Furthermore, the target resource sorting count (X=2) for processor A-1 with the priority "$2^{nd}$" is calculated as "630 pieces" according to the above-mentioned Expression (2) where the distribution count is "2," the reference response speed is "3 seconds," the distribution processing weight is "0.21," and the response time per resource is "2 msec."

However, since the total number of target resources is 2500 pieces, the target resource sorting count for processor A-1 with the priority "$2^{nd}$" will be terminated with 2500 pieces −2160 pieces=340 pieces.

In step S32 as described above, the request distribution transmission/reception program 111 performs the calculation so that, for example, the number of target resources of the configuration management request, regarding which the request type is "GET (acquisition of the configuration information)," the target resource is "Volume," and the number of target resources is "2500 pieces," will be sorted to the two processors, processors B-1 and A-1. Also, in step S32, the request distribution transmission/reception program 111 performs the calculation to sort the configuration management request so that, for example, processor B-1 will acquire the configuration management request with the number of target resources "2160 pieces" and processor A-1 will acquire the configuration management request with the number of target resources "340 pieces."

Next, the request distribution transmission/reception program 111 registers the configuration management request, which was received in step S31, in the accepted request table 124 and registers the configuration management request distribution method (the distribution requests), which was calculated in step S32, in the distribution request table 125 (step S33).

Specifically speaking, the request distribution transmission/reception program 111 associates the configuration management request received in step S31 with the accepted request ID and the distribution count and registers them in the accepted request table 124. Also, the request distribution transmission/reception program 111 associates the configuration management request distribution method (the distribution requests) calculated in step S32 with the distribution request ID, the accepted request ID (the accepted request ID of the configuration management request received in step S31), the processing processor, and the number of resources and registers it (them) in the distribution request table 125.

Next, the request distribution transmission/reception program 111 transmits the distribution requests to each of the processors 22 which are the distribution destinations determined in step S32 (step S34).

Then, the request distribution transmission/reception program 111 waits to receive the processing results of the distribution requests from the request processing program 211 operating on the distribution destination processors 22 to which the distribution requests were transmitted in step S34 (step S35). In step S35, the request distribution transmission/reception program 111 stores the generation information of the relevant distribution request, as the processing result of the distribution request, in the distribution request table every time it receives the processing result of the distribution request from the request processing program 211.

Subsequently, the request distribution transmission/reception program 111 judges whether the processing results of all the distribution requests which were transmitted in step S34 have returned or not (step S36). If the processing results of all the distribution requests which were transmitted in step S34 have returned (step S36: YES), the request distribution transmission/reception program 111 proceeds to the processing in step S37. On the other hand, if the processing results of all the distribution requests which were transmitted in step S34 have not returned (step S36: NO), the request distribution transmission/reception program 111 returns to the processing in step S35.

In step S37, the request distribution transmission/reception program 111 judges whether the generation information of the processing results of all the distribution requests received in step S35 matches each other or not (step S37). If the generation information of the processing results of all the distribution requests received in step S35 matches each other (step S37: YES), the request distribution transmission/reception program 111 proceeds to the processing in step S38. On the other hand, if the generation information of the processing results of all the distribution requests received in step S35 does not match each other (step S37: NO), the request distribution transmission/reception program 111 proceeds to the processing in step S39.

In step S38, the request distribution transmission/reception program 111 combines the processing results of the received distribution requests and returns them to the administrative terminal 20. After step S38 is completed, the request distribution transmission/reception program 111 terminates the processing of the request distribution transmission/reception program upon accepting the request.

On the other hand, in step S39, the request distribution transmission/reception program 111 retransmits the distribution request(s) whose the generation information is not the latest (the largest) to each of the processors 22. After step S39 is completed, the request distribution transmission/reception program 111 returns to the processing in step S35.

(1-13) Accepted Request and Distribution Request Management Method

Figure 18:
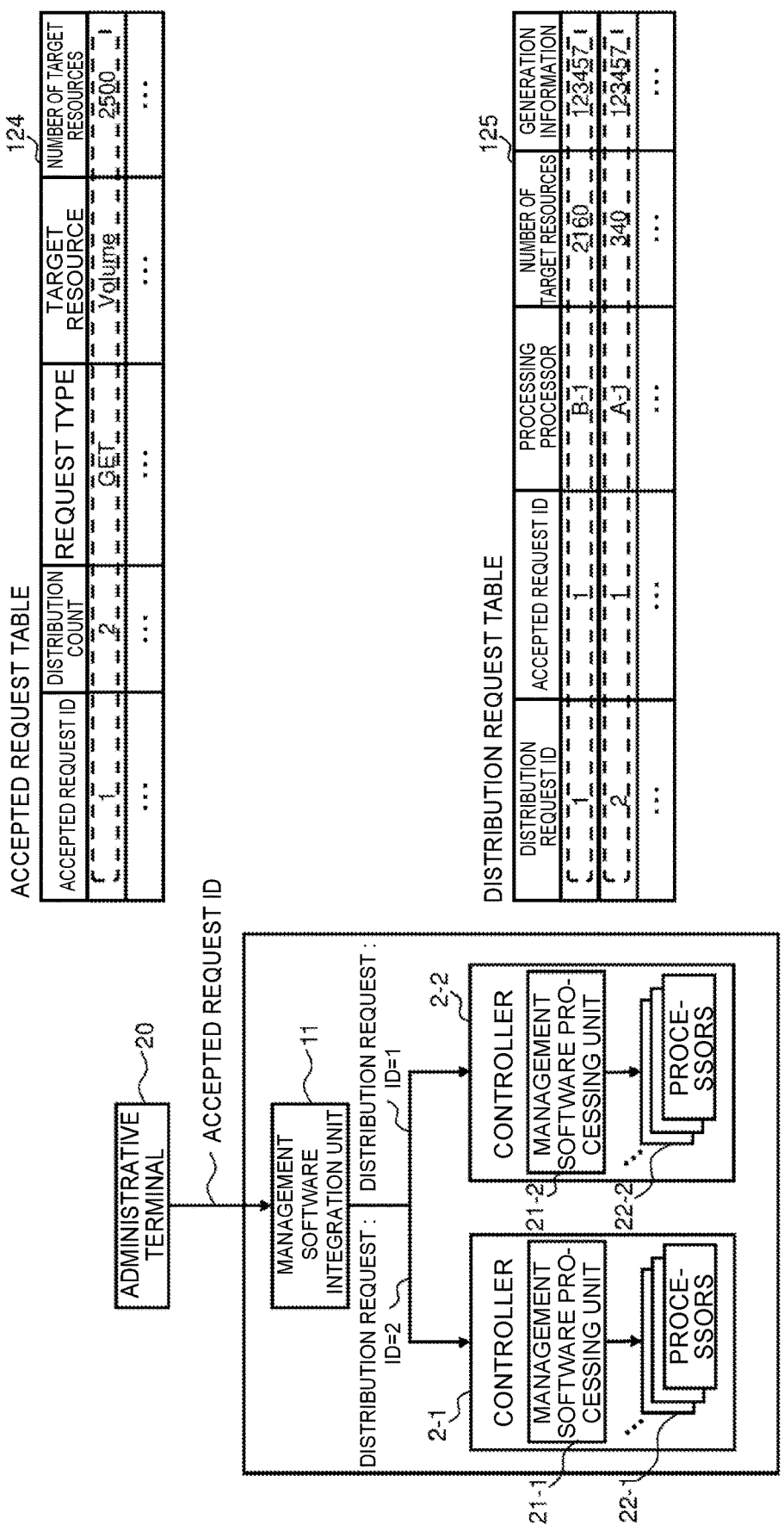
FIG. 18 is a diagram for explaining an accepted request and distribution request management method.

FIG. 18 is a diagram for explaining an accepted request and distribution request management method. The management of the configuration management request accepted from the administrative terminal 20 (the accepted request) and the distribution requests obtained by dividing the configuration management request (step S33) during the processing of the request distribution transmission/reception program upon accepting the request as illustrated in FIG. 17 will be explained with reference to FIG. 18.

The management software integration unit 11 accepts a configuration management request, regarding which the request type is "GET," the target resource is "Volume," and the number of target resources is "2500," from the administrative terminal 20 as the accepted request with the accepted request ID "1." Then, the management software integration unit 11 determines to distribute the accepted request with the accepted request ID "1" to two distribution requests with the distribution request ID "1" and the distribution request ID "2." Subsequently, the management software integration unit 11 adds a record of the accepted request ID "1," the distribution count "2," the request type "GET," the target resource "Volume," and the number of target resources "2500" to the accepted request table 124 as illustrated in FIG. 18.

Furthermore, the management software integration unit 11 determines the processors 22 to process the distribution requests and the number of target resources, on which each processor 22 is caused to execute the distribution processing, on the basis of the reference response speed and the priority of the distribution processing weight of the processors 22. For example, the management software integration unit 11 determines to cause the processor 22-2 (the processing processor B-1) for the controller 2-2 to execute the distribution processing on the number of target resources "2160" of the distribution requests with the distribution request ID "1" and cause the processor 22-1 (the processing processor A-1) for the controller 2-1 to execute the distribution processing on the number of target resources "340" of the distribution requests with the distribution request ID "2."

Then, the management software integration unit 11 links the accepted request ID with the distribution request ID. The management software integration unit 11 adds a record of the distribution request ID "1," the accepted request ID "1," the processing processor "B-1," and the number of target resources "2160" and a record of the distribution request ID "2," the accepted request ID "1," the processing processor "A-1," and the number of target resources "340" to the distribution request table 125 as illustrated in FIG. 18.

Subsequently, when the generation information of the result of the processing executed by the processor 22-2 via the management software processing unit 21-2 on the distribution request with the distribution request ID "1" and the generation information of the result of the processing executed by the processor 22-1 via the management software processing unit 21-1 on the distribution request with the distribution request ID "2" are returned, the management software integration unit 11 stores the generation information in the distribution request table 125.

If the generation information of the respective distribution requests with the distribution request ID's "1" and "2" matches each other, the management software integration unit 11 combines the processing results of the distribution requests and returns them to the administrative terminal 20. On the other hand, if the generation information of the distribution requests with the distribution request ID's "1" and "2" does not match each other, the management software integration unit 11 retransmits the distribution request(s), regarding which the generation information that is not the latest has been returned, to the distribution destination processors 22.

(1-14) Non-Matching of Generation Information

Figure 19:
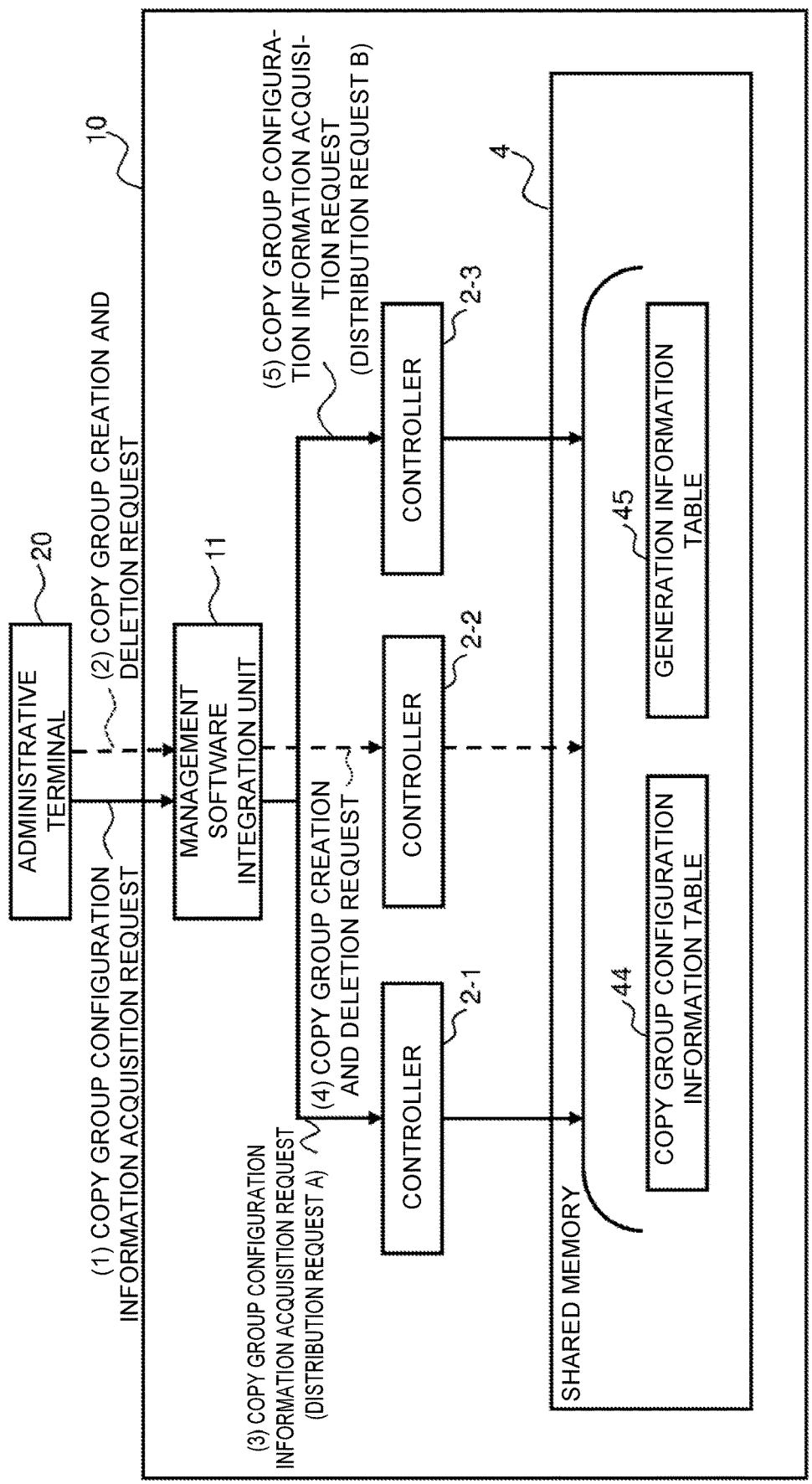
FIG. 19 is a diagram for explaining a non-matching example of generation information.
Figure 20:
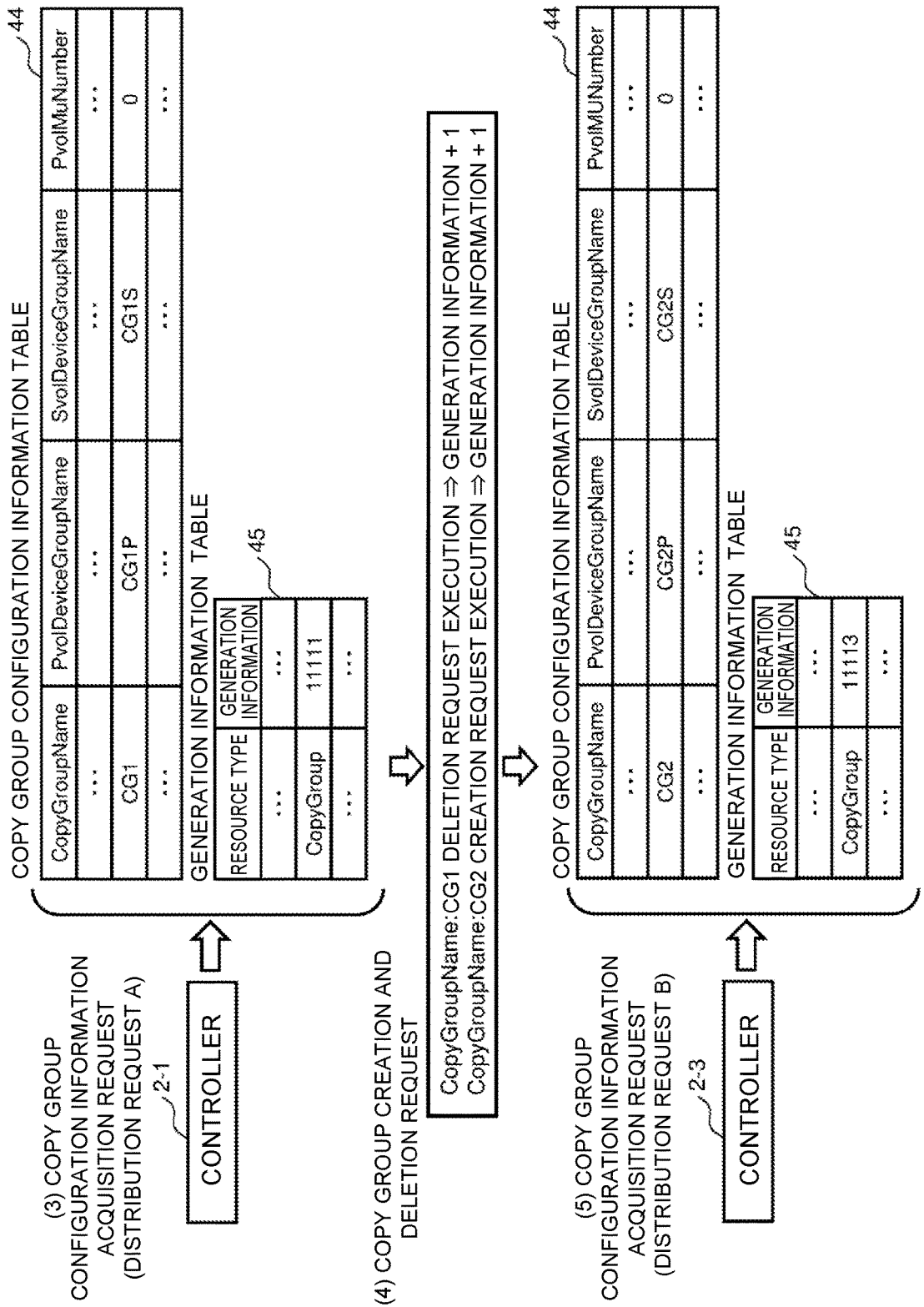
FIG. 20 is a diagram for explaining a non-matching example of the generation information.

FIG. 19 and FIG. 20 are diagrams for explaining non-matching examples of the generation information. Non-matching of the generation information during the processing of the request distribution transmission/reception program upon accepting the request(s) (step S37) as illustrated in FIG. 17 will be explained with reference to FIG. 19 and FIG. 20.

For example, as illustrated in FIG. 19, let us assume that after receiving (1) a Copy Group configuration information acquisition request from the administrative terminal 20, the management software integration unit 11 receives (2) a Copy Group creation and deletion request. Then, the management software integration unit 11 determines to cause the processors 22 for the controllers 2-1, 2-3 to execute the distribution processing on the Copy Group configuration information acquisition request according to the load status of the processors 22 and cause the processors 22 for the controller 2-2 to process the Copy Group creation and deletion request.

Then, let us assume that the request processing is executed according to the load status of the controllers 2-1, 2-2, 2-3 in the order of (3) a Copy Group configuration information acquisition request (distribution request A), (4) a Copy Group creation and deletion request, and (5) a Copy Group configuration information acquisition request (distribution request B).

Upon the execution of (3) the Copy Group information acquisition request (the distribution request A) by the controller 2-1 as illustrated in FIG. 20, the Copy Group configuration information table 44 includes a record of the Copy Group Name "CG1," the Pvol Device Group Name "CG1P," the Svol Device Group Name "CG1S," and the Pvol Mu Number "0" and the generation information table 45 includes a record of the resource type "Copy Group," and the generation information "11111," so that the Copy Group configuration information including them and the generation information are acquired.

However, when (4) the Copy Group deletion request to delete Copy Group Name "CG1" is executed by the controller 2-2, the record of the Copy Group Name "CG1" is deleted from the Copy Group configuration information table 44 and +1 is added to the generation information of the resource type "Copy Group" in the generation information table 45. Furthermore, when (5) the Copy Group creation request to create the Copy Group Name "CG2" is executed by the controller 2-2, a record of the Copy Group Name "CG2," the Pvol Device Group Name "CG2P," the Svol Device Group Name "CG2S," and the Pvol Mu Number "0" is added in the Copy Group configuration information table 44 and +1 is further added to the generation information of the resource type "Copy Group" in the generation information table 45.

As a result, when (5) the Copy Group information acquisition request (distribution request B) is executed by the controller 2-3, the Copy Group configuration information table 44 does not include the record of the Copy Group Name "CG1," but includes the Copy Group Name "CG2," the Pvol Device Group Name "CG2P," the Svol Device Group Name "CG2S," and the Pvol Mu Number "0" and the generation information table 45 includes the resource type "Copy Group," and the generation information "11113," so that the Copy Group configuration information including them and the generation information are acquired.

Accordingly, when the Copy Group configuration is updated by executing the Copy Group creation and deletion request while the distribution request A and the distribution request B obtained by distributing one Copy Group configuration information acquisition request are executed, the generation information no longer matches each other and the respective processing results of the distribution request A and the distribution request B may become inconsistent to each other. Or even if no inconsistency has occurred, but if the generation information does not match each other, there is a possibility that there may be a delay in reflecting the processing of the Copy Group creation and deletion request.

When one configuration information acquisition request is processed as a plurality of distribution requests and if the generation information does not match each other, the acquisition of the latest configuration information has failed and, therefore, there is a possibility that the next configuration change processing might be affected. On the other hand, if the generation information matches each other, the configuration information of the same generation has been successfully acquired for the plurality of distribution requests and, therefore, the configuration information obtained by combining the processing results of the plurality of distribution requests does not include any contradiction or inconsistency.

(1-15) Request Processing of Request Processing Program

Figure 21:
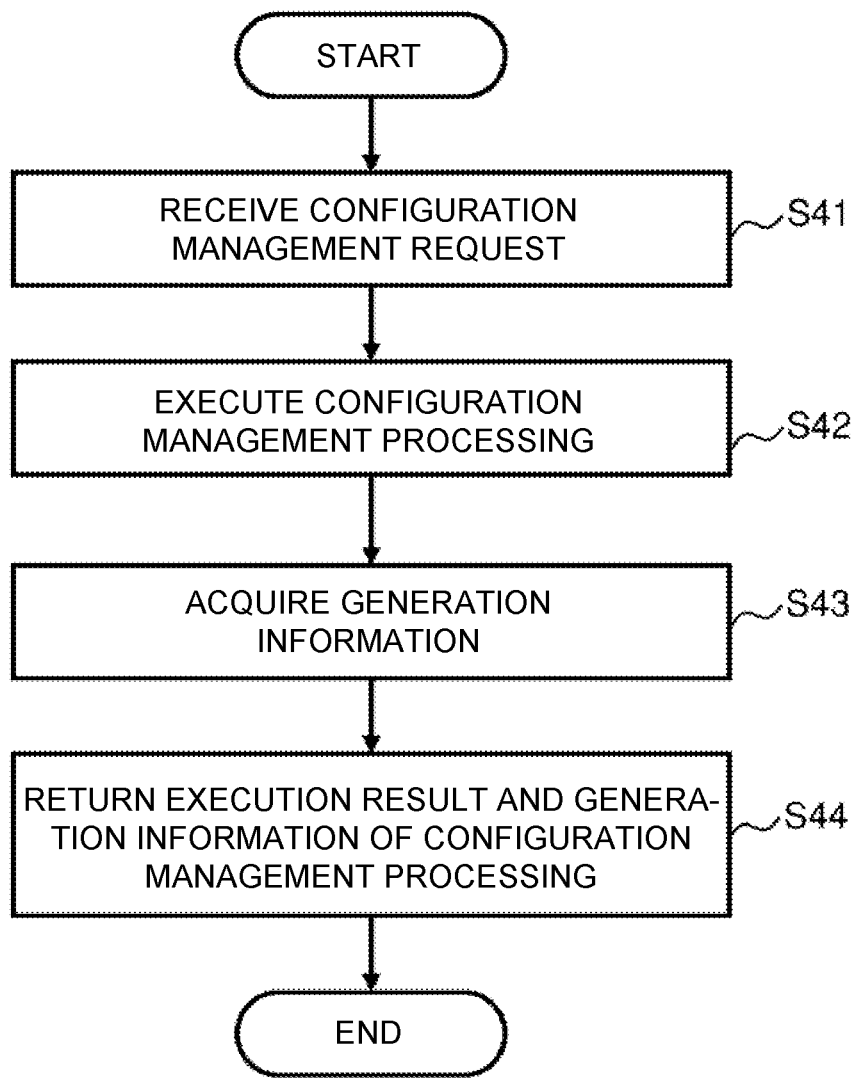
FIG. 21 is a flowchart illustrating request processing of a request processing program.

FIG. 21 is a flowchart illustrating request processing of a request processing program. The request processing of the request processing program 211 is processing executed every time a configuration management request (including a distribution request) is received from the request distribution transmission/reception program 111.

The request processing program 211 firstly receives the configuration management request from the request distribution transmission/reception program 111 (step S41). Next, the request processing program 211 executes the configuration management processing by using the processor designated by the request distribution transmission program (step S42).

Then, the request processing program 211 acquires the generation information of a target resource type of the configuration management request received in step S41 from the generation information table 45 (step S43). Subsequently, the request processing program 211 returns the execution result of the configuration management processing in step S42 and the generation information to the request distribution transmission/reception program 111 (step S44). When step S44 is completed, the request processing program 211 terminates the request processing.

(1-16) Processor Operating Rate and Write Pending Transmission Processing

Figure 22:
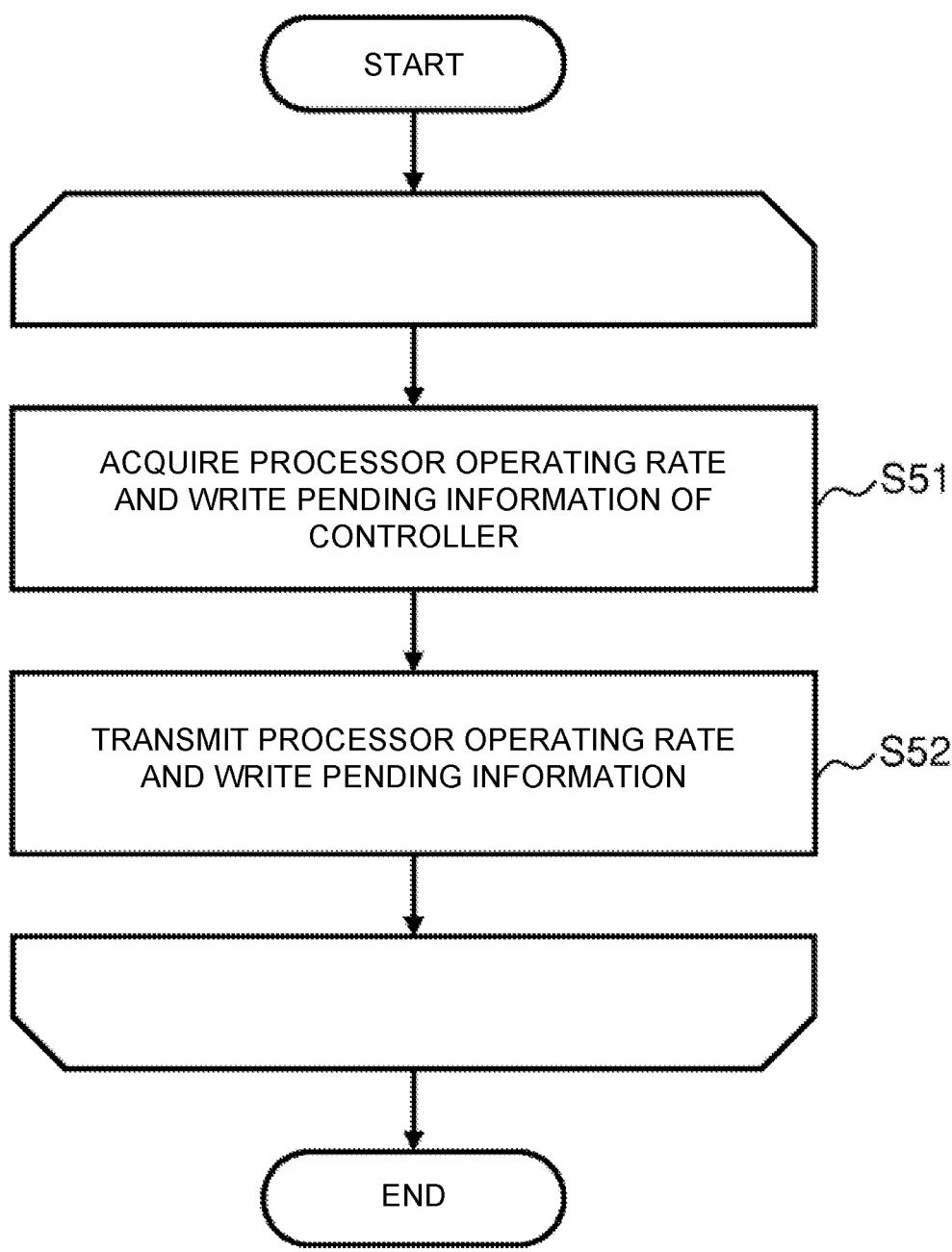
FIG. 22 is a flowchart illustrating processor operating rate and Write Pending information transmission processing.

FIG. 22 is a flowchart illustrating the processor operating rate and Write Pending information transmission processing. The processor operating rate and Write Pending transmission processing is processing executed repeatedly by the processor operating rate and Write Pending information transmission program 212 while the storage apparatus 10 is in operation.

The processor operating rate and Write Pending information transmission program 21 firstly acquires the processor operating rate and the Write Pending information of each processor 22 from the storage configuration information table (which is not illustrated in the drawing) stored in the shared memory 4 (step S51). The storage configuration information table is managed and updated by the storage configuration management program 23.

Next, the processor operating rate and Write Pending information transmission program 212 transmits the processor operating rate and the Write Pending information of each processor, which were acquired in step S51, to the request distribution transmission/reception program 111 (step S52). The processor operating rate and Write Pending information transmission program 212 executes step S51 and S52 repeatedly.

(1-17) Advantageous Effects of First Embodiment

According to the first embodiment, the processor 22 which is determined from among the plurality of processors 22 according to the request content of the configuration management request and the load status of each processor 22 of the plurality of controllers 2 is caused to execute the distributed parallel processing on the configuration management request. Therefore, even if the configuration management request data or response data is large or if the processing load of the I/O processing which is preferentially processed than the configuration management processing is high, it is possible to level the configuration management processing load and enhance the processing speed.

Moreover, since the processor 22 which is caused to execute the distributed parallel processing on the configuration management request on the basis of the processor operating rate and the Write Pending information is determined, it is possible to reduce the performance interference with the I/O processing on the storage device 3 and also suppress a reduction of the processing speed of the configuration management processing and enhance the configuration management response performance.

Furthermore, the generation information which is an index for judging whether the configuration information is new or old is managed with respect to each piece of configuration information; and when the generation information of the distribution processing results of the distribution requests for the plurality of processors 22 does not match each other, the processor 22 to which the processing result of the generation information that is not the latest is returned is caused to execute the distribution request again. Therefore, it is possible to prevent the occurrence of inconsistency in the processing results which might be caused by executing the request processing of the distribution requests, which are obtained by dividing one configuration management request, on the basis of the configuration information of different generations.

(2) Second Embodiment

According to the first embodiment, the storage apparatus 10 has one management software integration unit 11 and a plurality of management software processing units 21. Then, the management software integration unit 11 performs control to cause the plurality of management software processing units 21 to execute the distribution processing so that the plurality of processors 22 with low loads can execute the parallel processing of the configuration management request on the basis of the processor operating rate and the Write Pending information of each processor 22.

On the other hand, according to a second embodiment, a storage apparatus 10B has a plurality of management software integration units 11B and any one of the management software integration units 11B causes the plurality of management software processing units 21 to execute the configuration management request distribution processing.

Figure 23:
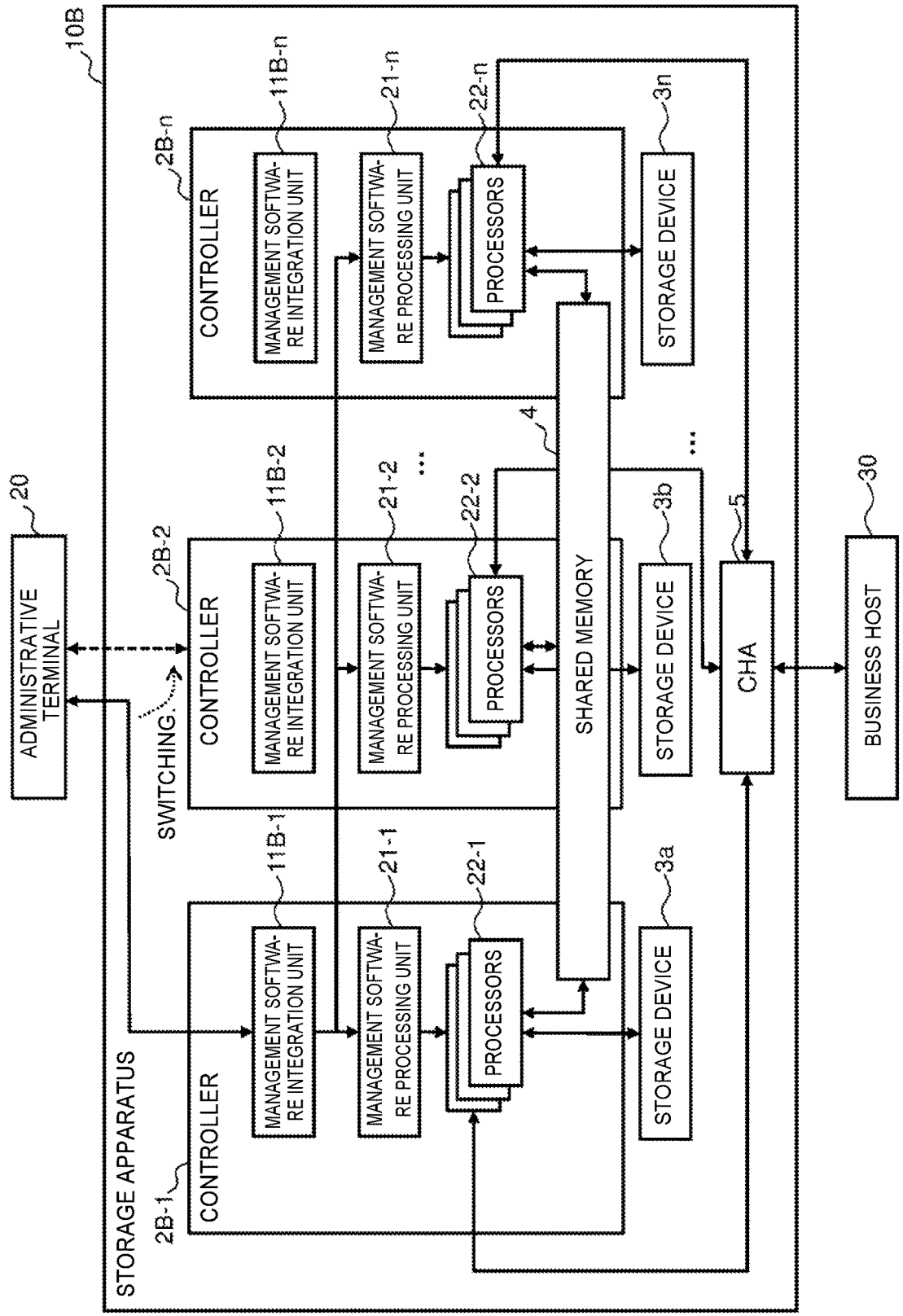
FIG. 23 is a diagram illustrating a configuration example of a storage apparatus according to a second embodiment.

FIG. 23 is a diagram illustrating a configuration example of a storage apparatus according to a second embodiment. With a storage apparatus 10B according to the second embodiment as illustrated in FIG. 23, each of all controllers 2B (2B-1, 2B-2, to 2B-n) has a management software integration unit 11B (11B-1, 11B-2, to 11B-n) and a management software processing unit 21 (21-1, 21-1, to 21-n).

Then, in an initial state, the management software integration unit 11B for a specified one controller 2B serves as a master and performs control to cause the plurality of management software processing units 21 (21-1, 21-1 to 21-n) and the processors 22 (22-1 to 22-n) to execute the processing for distributing the configuration management request.

For example, in the initial state, the management software integration unit 11B-1 for the controller 2B-1 serves as the master and the management software integration units 11B-2 to 11B-n for the controllers 2B-2 to 2B-n enter a standby state. Then, the management software integration unit 11B-1 which is the master performs control to cause the plurality of management software processing units 21 (21-1, 21-1, to 21-n) and the processors 22 (22-1, 22-2, to 22-n) to execute the processing for distributing the configuration management request.

Specifically speaking, if a failure occurs at the controller 2B-1 (for example, a failure at the management software integration unit 11B-1, the management software processing unit 21, or the processor 22) and this makes it impossible to continue the control of the configuration management request distribution processing by the management software integration unit 11B-1, the controller 2B-1 transfers the control of the distribution processing to another controller 2B (for example, the controller 2B-2).

Then, the management software integration unit 11B-2 for the controller 2B-2 continues the control to cause the plurality of management software processing units 21 (21-2 to 21-n) and the processors 22 (22-2 to 22-n), excluding the management software processing unit 21-1 and the processors 22-1 for the controller 2B-1, to execute the processing for distributing the configuration management request.

Incidentally, other controllers 2B to which the control of the distribution processing is transferred are determined in accordance with majority logic or in a predetermined rank order.

Furthermore, when the processing load of the controller 2B for performing the control to cause the execution of the configuration management request distribution processing becomes equal to or more than a specified value and enters a high state or when the occurrence of a failure at that controller 2B is predicted, the control of the distribution processing may be transferred to another controller 2B.

According to the second embodiment, each of the plurality of controllers 2B is provided with the management software integration unit 11B having the function distributing the configuration management request(s). Therefore, if a failure or the like occurs at the management software integration unit 11B which distributes the configuration management request, the control to distribute the configuration management request is transferred to another management software integration unit 11B, thereby making it possible to enhance failure tolerance of the management software integration unit 11B.

Furthermore, by transferring the control of the distribution processing to another controller 2B in consideration of the processing load of the management software processing unit 21 and the processors 22, which the controller 2B has, as well as the failure occurrence and the failure occurrence prediction, it is possible to eliminate any inconvenience to make the management software processing unit 21 and the processors 22, which are inappropriate, as the distribution destinations of the distribution requests and to efficiently execute the distribution processing of the distribution requests.

(3) Third Embodiment

Figure 24:
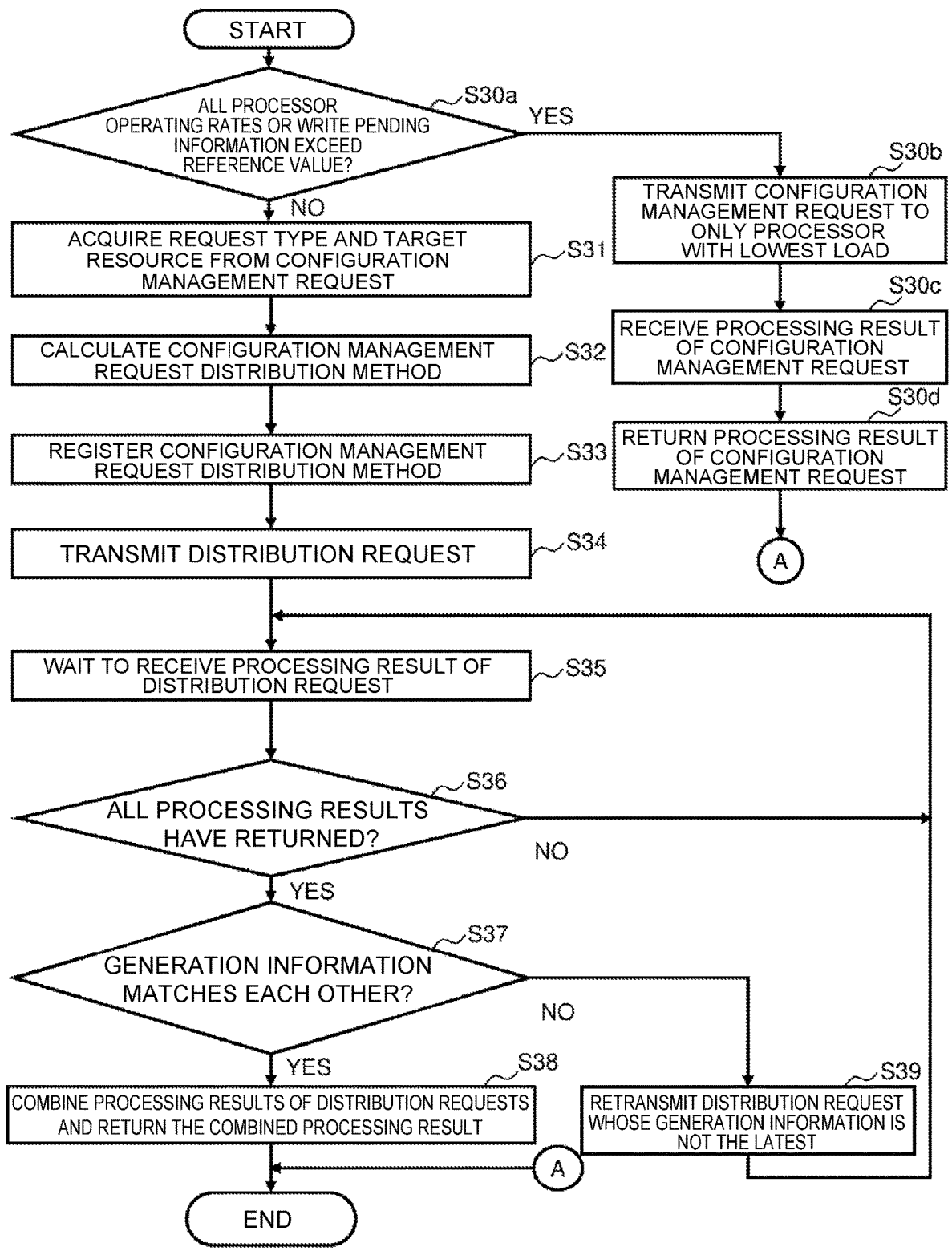
FIG. 24 is a flowchart illustrating processing of the request distribution transmission/reception program upon receiving the processor operating rate and the Write Pending information according to a third embodiment.

FIG. 24 is a flowchart illustrating processing of the request distribution transmission/reception program upon receiving the processor operating rate and the Write Pending information according to a third embodiment. FIG. 24 shows the difference from the first embodiment, that is, judgment processing in step S30a executed before step S31 of the flowchart illustrating the processing of the request distribution transmission/reception program upon accepting a request(s) in FIG. 17.

The request distribution transmission/reception program 111 firstly judges whether the processor operating rate or the Write Pending information of all the processors 22 exceeds a reference value or not (step S30a). For example, the request distribution transmission/reception program 111 judges whether the processor operating rate of all the processors 22 exceeds, for example, 90% or not or whether the Write Pending information of all the processors 22 exceeds, for example, 100 MB or not.

If the processor operating rate or the Write Pending information of all the processors 22 exceeds the reference value (step S30a: YES), the request distribution transmission/reception program 111 proceeds to the processing in step S30b.

In step S30b, the request distribution transmission/reception program 111 transmits the configuration management request to only the processor 22 with the lowest load (the processor whose priority 1227 is the $1^{st}$ (see FIG. 4)). Next, the request distribution transmission/reception program 111 receives the processing result of the configuration management request transmitted in step S30b (step S30c).

Then, the request distribution transmission/reception program 111 returns the processing result of the configuration management request received in step S30c to the administrative terminal 20 (step S30d). When step S30d is completed, the request distribution transmission/reception program 111 terminates the processing of the request distribution transmission/reception program upon accepting the request(s).

On the other hand, when the processor operating rate and the Write Pending information of all the processors 22 do not exceed the reference value (step S30a: NO), the request distribution transmission/reception program 111 proceeds to the processing in step S31. Subsequent steps are the same as the processing flow of the processing of the request distribution transmission/reception program upon accepting the request(s) as illustrated in FIG. 17.

According to the third embodiment, when the I/O processing load of all the processors 22 is high, only one processor 22 with the lowest load is caused to execute the processing without having the plurality of processors 22 execute the configuration management request distribution processing. Therefore, it is possible to reduce the influence by the configuration management request(s) on the I/O processing.

(4) Fourth Embodiment

In the first embodiment, the distribution processing weight is calculated according to the aforementioned Expression (1). However, without limitation to this example, when it is judged in step S32 illustrated in FIG. 17 that the configuration management request cannot be processed within desired time (a reference response speed), the request distribution transmission/reception program 111 recalculates the distribution processing weight of each processor 22 according to, for example, the following Expression (3).

[Math. 3]

$$\text{DISTRIBUTION PROCESSING WEIGHT} = \frac{A \times \frac{\text{PROCESSOR OPERATING RATE}}{100} + B \times \frac{\text{WRITE PENDING INFORMATION}}{\text{REFERENCE MEMORY AMOUNT}}}{\Sigma \text{ DISTRIBUTION PROCESSING WEIGHT}} \quad (3)$$

In the above-mentioned Expression (3), "A" represents a weighting coefficient determined according to the scale of the configuration of the storage apparatus 10 or the priority of the process which is set by the user in advance; and "B" represents a weighting coefficient determined according to the "estimated response time" of the configuration management request. Incidentally, the denominator "Σ distribution processing weight" of the right side of the above-mentioned Expression (3) represents the sum of distribution processing weights of all the processors.

Then, the request distribution transmission/reception program 111 determines the processor 22 to distribute the configuration management request in accordance with the priority according to the distribution processing weight recalculated according to the above-mentioned Expression (3). Subsequently, the request distribution transmission/reception program 111 substitutes the recalculated distribution processing weight in the aforementioned Expression (2), thereby determining the processors 22, which are caused to execute the configuration management request distribution processing, and the number of target resources to be sorted to each processor 22.

In the fourth embodiment, the configuration management request distribution method is calculated by using the distribution processing weight calculated according to the above-mentioned Expression (3) instead of the aforementioned Expression (1). Therefore, the configuration management request distribution processing can be optimized by calculating the processors 22 to distribute the configuration management request(s) and the number of target resources to be sorted by preferentially considering the future load (the Write Pending information) than the current load (the processor operating rate) and increasing the degree of influence of the future load.

The present invention is not limited to each embodiment or each variation described above; and other embodiments which can be thought within the range of the technical idea of the present invention can be included within the scope of the present invention unless they depart from the gist of the present invention. Also, the present invention can be implemented in various embodiments unless they depart from the gist of the present invention. For example, the respective configurations and the respective processing sequences illustrated in each of the embodiments and the variations described above may be integrated or separated as appropriate according to embodiments or processing efficiency.

REFERENCE SIGNS LIST 2, 2-1 to 2-n, 2B, 2B-1 to 2B-n: controllers
3, 3-1 to 3-n: storage devices
4: shared memory
10, 10B: storage apparatus
11, 11B, 11B-1 to 11B-n: management software integration unit
20: administrative terminal
21, 21-1 to 21-n: management software processing units
22, 22-1 to 22-n: processors
23: storage configuration management program
30: business host
41: Volume configuration information table
42: Pool configuration information table
43: Host Group configuration information table
44: Copy Group configuration information table
45: generation information table
111: request distribution transmission/reception program
121: mounted drive table
122: controller table
123: response speed table
124: accepted request table
125: distribution request table
211: request processing program
212: processor operating rate and Write Pending information transmission program

The invention claimed is:

1. A storage apparatus including a plurality of controllers, each of which has a plurality of processors, for processing requests, and a storage device, the storage apparatus comprising:
   an integration unit that integrally controls the plurality of controllers; and
   a shared memory that can be accessed from each processor for the plurality of controllers and stores configuration information of the storage apparatus including load information of each processor;
   wherein the integration unit:
   calculates estimated processing time of a configuration management request, which has been accepted from a management apparatus, from a request type and a target resource type of the configuration management request;
   distributes the configuration management request to a plurality of distribution requests on the basis of the load information of each processor acquired from the shared memory and the estimated processing time;
   determines a distribution destination processor for processing each of the plurality of distribution requests; and
   transmits each of the distribution requests to a controller, of the plurality of controllers, which has the determined distribution destination processor, respectively,
   wherein after receiving the respective distribution request, the respective controller of the plurality of controllers, which has the determined distribution destination processor, causes the determined distribution destination processor to process the respective distribution request.

2. The storage apparatus according to claim 1,
   wherein the integration unit measures processing time of the configuration management request per unit data quantity or specified data volume for each request type and each target resource type in advance and calculates the estimated processing time by multiplying a required data quantity or data volume of the configuration management request accepted from the management apparatus by the processing time measured in advance.

3. The storage apparatus according to claim 1,
wherein the integration unit determines the number of the distribution requests obtained by distributing the configuration management request on the basis of the estimated processing time.

4. The storage apparatus according to claim 1,
wherein the integration unit calculates a priority of each processor from the load information of each processor in advance and determines the distribution destination processor according to the calculated priority.

5. The storage apparatus according to claim 1,
wherein the shared memory stores configuration information of each target resource type and generation information of the configuration information,
wherein when having processed the respective distribution request, the respective controller, which has the determined distribution destination processor, acquires the generation information of the target resource type of the distribution request from the shared memory and transmits the acquired generation information together with a processing result of the respective distribution request to the integration unit, and
wherein when the integration unit has received processing results of all the distribution requests and the generation information and in response to all pieces of the generation information matching each other, the integration unit integrates the processing results of all the distribution requests and transmits the integrated processing results to the management apparatus, and
wherein, in response to all pieces of the generation information not matching each other, the integration unit retransmits the respective distribution request of the generation information, which is not the latest, to the respective controller which has the determined distribution destination processor.

6. The storage apparatus according to claim 1,
wherein the load information is an operating rate of each processor and a data volume which is temporarily stored in a cache region and is waiting to be written to the storage device of each processor.

7. The storage apparatus according to claim 6,
wherein the integration unit judges whether processing time required when the configuration management request is processed by being distributed to the distribution requests exceeds desired processing time or not, on the basis of the estimated processing time and the load information, and
wherein, when the processing time exceeds the desired processing time, the integration unit increases and makes a degree of influence on the data volume, which is waiting to be written to the storage device of each processor, higher than the operating rate of each processor from among the load information of each processor acquired from the shared memory, distributes the configuration management request to a plurality of distribution requests on the basis of the load information and the estimated processing time, and determines the distribution destination processor to process each of the plurality of distribution requests.

8. The storage apparatus according to claim 1,
wherein each of the plurality of controllers has the integration unit,
wherein the integration unit of any one of the controllers integrally controls the plurality of controllers and integration units of other controllers enter a standby state, and
wherein, if a failure occurs at the one controller which integrally controls the plurality of controllers, the integration unit is switched to any one of the integration units in the standby state in order to integrally control the plurality of controllers.

9. The storage apparatus according to claim 1,
wherein, in response to the load information of all the respective processors exceeding a threshold value, the integration unit does not distribute the configuration management request to the distribution requests, but instead designates a processor with the lowest load among all the processors and transmits the configuration management request to the controller which has the designated processor.

10. A configuration management request processing method for a storage apparatus including a plurality of controllers, each of which has a plurality of processors, for processing requests, and a storage device,
wherein the storage apparatus includes:
an integration unit that integrally controls the plurality of controllers; and
a shared memory that can be accessed from each processor for the plurality of controllers and stores configuration information of the storage apparatus including load information of each processor,
the method comprising the steps of:
calculating estimated processing time of a configuration management request, which has been accepted from a management apparatus, from a request type and a target resource type of the configuration management request;
distributing the configuration management request to a plurality of distribution requests on the basis of the load information of each processor acquired from the shared memory and the estimated processing time;
determining a distribution destination processor for processing each of the plurality of distribution requests; and
transmitting each of the distribution requests to a controller, of the plurality of controllers, which has the determined distribution destination processor, respectively, processor
wherein after receiving the respective distribution request, the respective controller of the plurality of controllers, which has the determined distribution destination processor, causes the determined distribution destination processor to process the respective distribution request.

* * * * *